May 10, 1932. L. H. MORRISON 1,857,736
APPARATUS FOR USE IN COMBINATION OR IN CONJUNCTION WITH A SEXTANT ADAPTED
FOR USE AS AN ARTIFICIAL HORIZON AND DIRECTION INDICATOR
Filed June 27, 1929   3 Sheets-Sheet 1
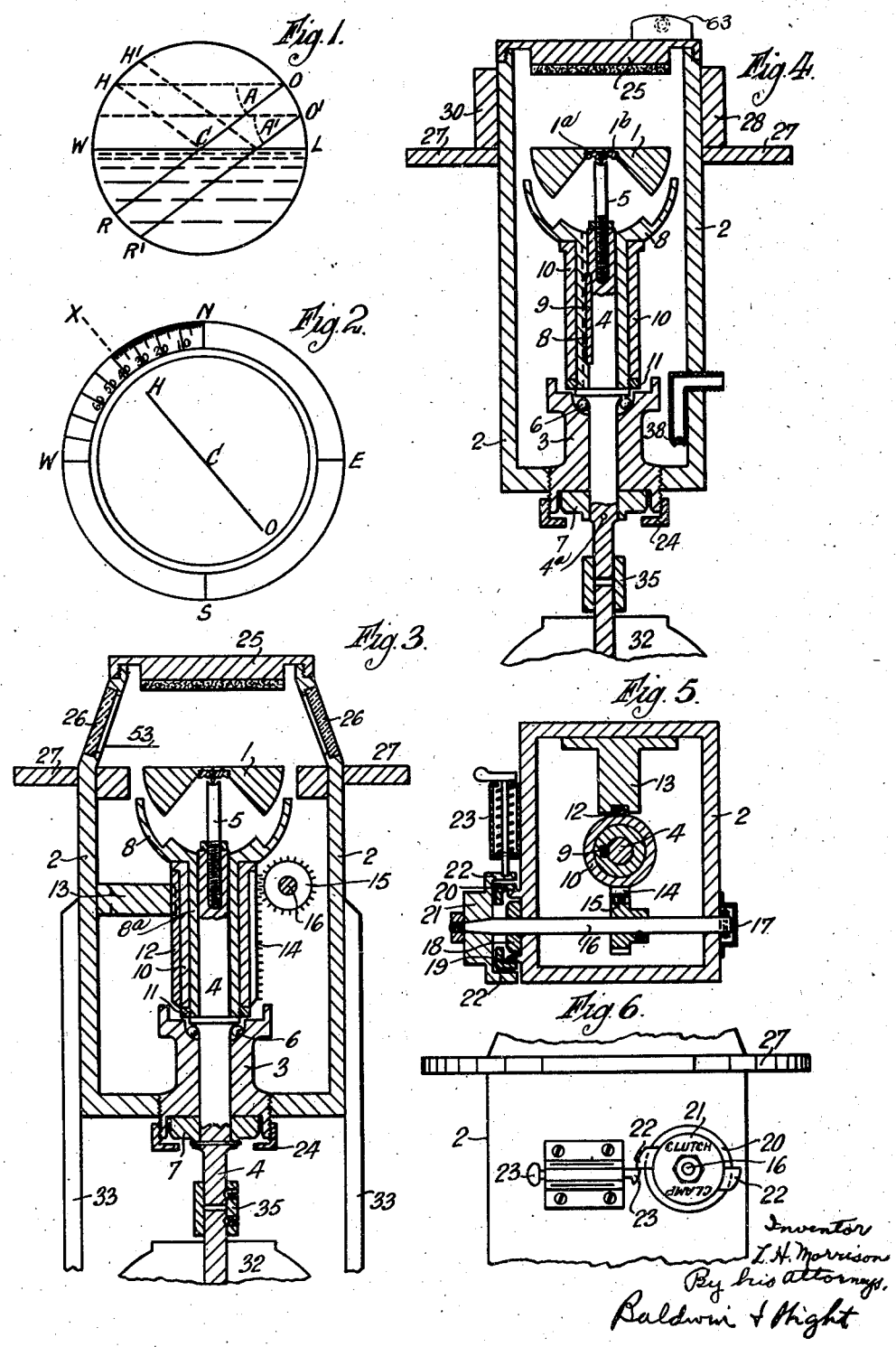

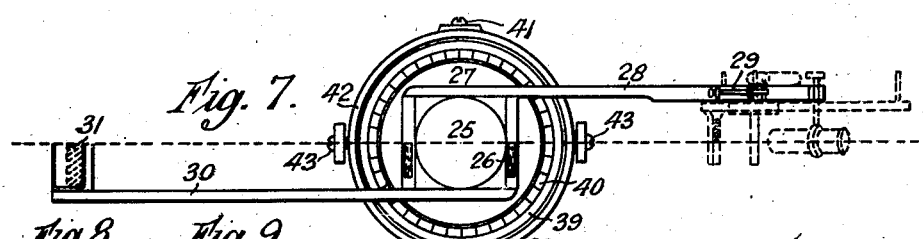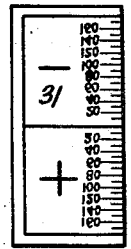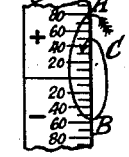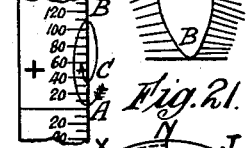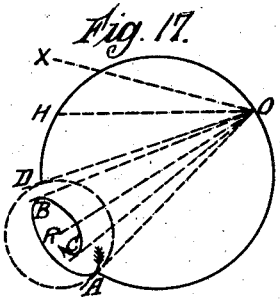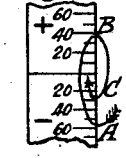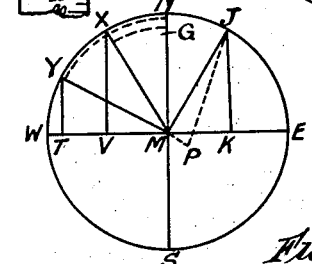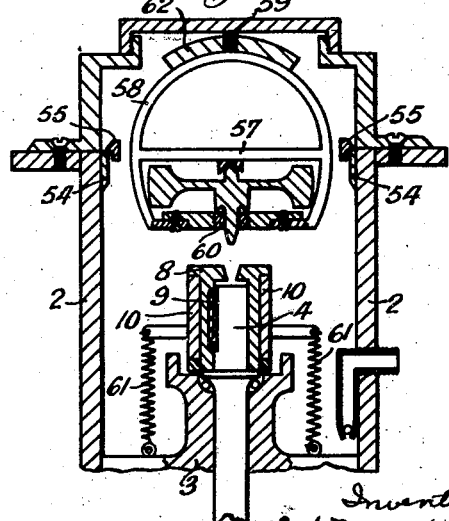

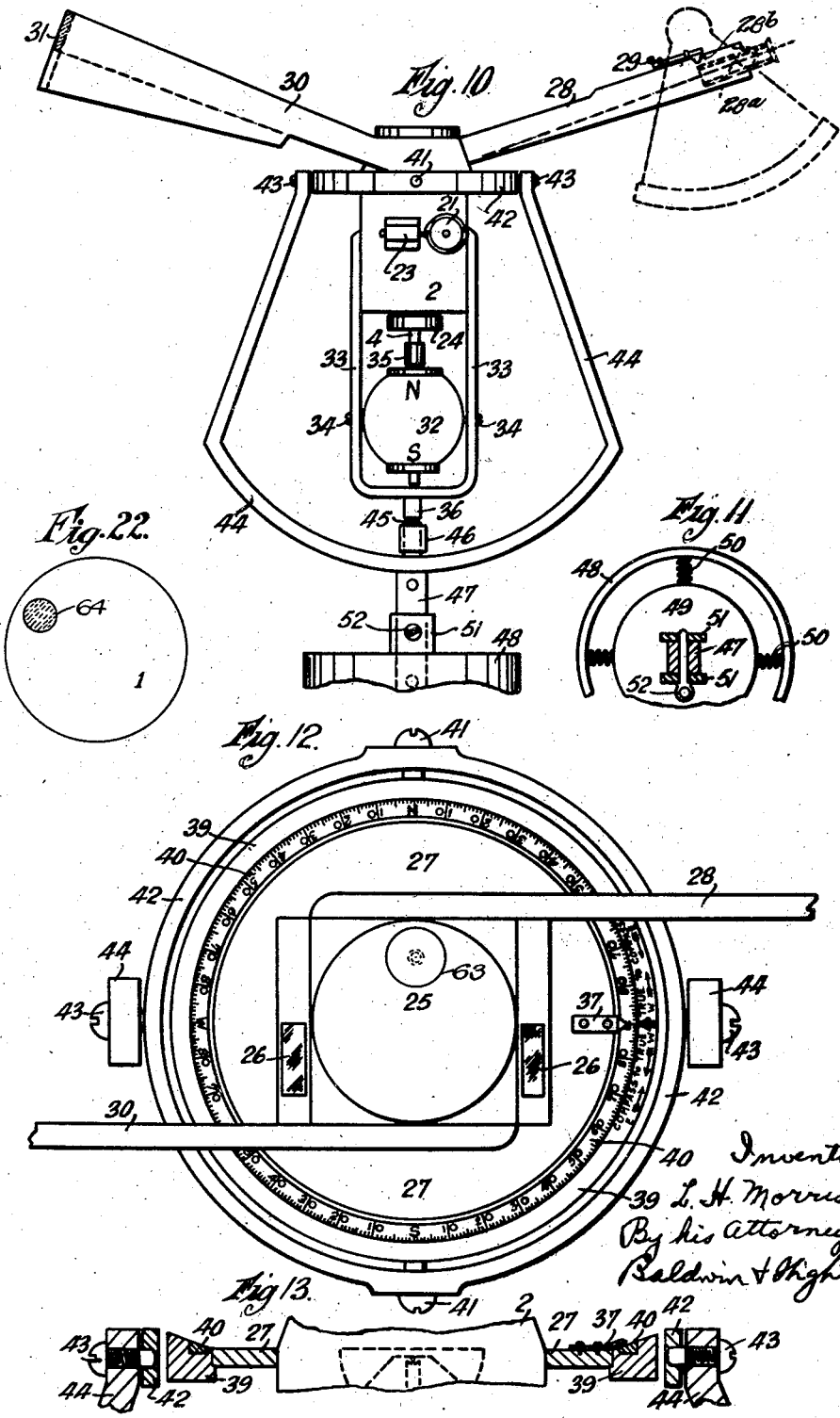

Patented May 10, 1932

1,857,736

UNITED STATES PATENT OFFICE

LAURENCE HENRY MORRISON, OF GRAVESEND, ENGLAND

APPARATUS FOR USE IN COMBINATION OR IN CONJUNCTION WITH A SEXTANT ADAPTED FOR USE AS AN ARTIFICIAL HORIZON AND DIRECTION INDICATOR

Application filed June 27, 1929, Serial No. 374,159, and in Great Britain July 24, 1928.

This invention relates to apparatus adapted to be used in conjunction or in combination with a sextant, and has for its object to provide improved means whereby an artificial horizon is formed and the direction of an observed body is indicated to an observer at the time of an observation. By this means, vertical angles extending from the zenith to below the natural horizon can be measured, and the vertical plane of direction through the observer and the observed body can be shown without the need of further observation or inspection of nautical tables.

Among other objects and advantages the invention seeks to provide:

(1) An optical device which presents an artificial horizon line, the artificial horizon being the reflected image of a horizontal line which is fixed relatively to the "point of observation," hereinafter referred to.

(2) An arrangement whereby the means of reflection, above referred to, is stabilized against disturbing influences such as arise from the rolling and pitching motions of a ship at sea.

(3) Means whereby direction is indicated to an observer at the time of an observation.

With a view to the clear understanding of the invention, each principle will now be explained in greater detail; and whilst explaining, Figures 1 and 2 will be referred to as occasion demands. Figure 1 represents the side view of a globe, and illustrates the optical principle disclosed herein. Figure 2 represents a top view of the same globe, and illustrates the method by which direction is indicated. In these two figures, the same reference letters are used throughout to define like, or similar points.

*The optical principle.*—Assume that the circle shown in Figure 1, is a section of a transparent and perfect globe half filled with, say, mercury WL.

C is the center of the globe, and the center of WL's reflecting surface.

O is the "point of observation;" and H is the position of a horizontal line, the reflected image of which forms the artificial horizon line R.

O and H are positioned on opposite sides of the globe, in the plane which passes through center C, their respective distances from C being equal. Again, O and H are fixed with relation to each other, but are free to move about C through both altitude and azimuth.

When O and H are in the same true horizontal plane, the artificial horizon plane is indicated by OCR.

The dotted line through the O indicates the true horizontal and the angle A represents the angle at O between the true horizontal and the artificial horizon plane.

Now, as O is moved to O¹, so will H move to H¹, and the reflected image of H¹ will be shown at R¹.

Th dotted line through O¹ again indicates the true horizontal, and as the line O¹R¹ is seen to be parallel to OCR, the angle A¹ must equal the original angle A. The angle A therefore remains constant, no matter how O and H move during the time of an observation. Consequently, the reflected image of H gives a reference line which is practically fixed relatively to the true horizontal.

The vertical angle or altitude of any visible body, say, above the true horizontal, can be obtained by simply subtracting the amount of angle A from the observed altitude. The angle A is therefore in the nature of a constant which must be applied to all altitudes measured, and it will be referred to later under the name of the horizon correction. Such is the optical principle employed to give an artificial horizon line.

*Arrangement whereby the means of reflection is stabilized.*—For use on shore, or where the instrument can remain in a condition of perfect rest, any reflecting surface which is perfectly plane and truly horizontal would answer the required purpose; but on shipboard where rolling, pitching and other motional effects are experienced, means must be provided to neutralize their disturbing effects on the reflecting medium. Here it is intended to use a gyroscope, that seeming a most perfect means of stabilization.

As the employment of a gyroscope, due to its precession, and the earth's rotation, necessitates certain corrections being made to an observed altitude, the two laws of the gyroscope will now be considered with a view to explaining those corrections, and to show generally how a gyroscope is applicable to this case.

The laws referred to are named respectively, the fixity in space, and the precessional law of the gyroscope; and to their combined action is due the fact that a gyroscope can answer the required purpose.

A gyroscope may be defined as a wheel so supported as to be free to rotate about its spinning axis, and meantime to move about two other axes perpendicular to each other, and to the spinning axis of the wheel. A wheel so universally mounted is usually referred to as having three degrees of freedom. A perfectly balanced spinning mass, its centre of gravity being in coincidence with its point of support, when endowed with the freedom as described, will maintain its axis in a fixed direction in space regardless of the manner in which its supporting frame is moved or tilted. Thus the fixity in space law manifests itself; and in order to explain the performance of a gyroscope when subjected solely to this law, the following illustration is given: Suppose that a gyroscope is in action in, say, 60 degrees north latitude, and is so positioned with respect to a star in the zenith, that its axis points directly to the star. The axis of the gyroscope will then be in the true vertical, but it will not long remain so. Immediately, the western rim of the gyro wheel will be depressed below the true horizontal, and this depression will move from west, through northwest, to north, and so on; whilst the gyro-axis remains fixedly pointing to the star. A gyroscope arranged at the commencement of its spin with its axis in the vertical will therefore, unless positioned at either pole of the earth, or on the equator, appear to trace a complete circle on the celestial concave, with its axis, once in every sidereal day. Thus the fixity in space law affects the gyroscope so as to show a daily round of precession, the direction of which is seen to be in opposition to the direction of the earth's rotation. This daily round of precession being caused by the earth's rotation, will henceforth be termed the rotational precession.

Now to consider the two exceptions, namely, when the gyro is spinning at the earth's pole, and when spinning on the equator. When positioned at either pole of the earth, a gyro spinning with its axis in the vertical will continue to maintain that position, its axis coinciding exactly with the axis of the earth. In this case there will be no rotational precession, and the axis will remain undisturbed in the true vertical.

On the equator, the above condition is, as it were, reversed. Here, the western edge of the spinning gyro will continue to depress with respect to the earth's surface, until after a period of twelve hours running the gyro will appear to have turned a complete somersault, its axis meanwhile remaining in this plane of the earth's equator.

From consideration of the above it can be seen that, from a navigational point of view an error will be occasioned by the rotational precession, and that this error will be zero at the poles of the earth and of maximum amount on the equator.

The law of precession may be made apparent by causing a force to push perpendicularly on one end of the gyro's spinning axle, when the spinning wheel will turn from its original direction in space, and at right angles to the direction of the applied force, with the attempt to bring its axis parallel to the new axis of rotation by the shortest path, and so that the spin of the wheel coincides with the direction of the applied force. Were the applied force made to act on the other end of the axle, the effect produced would be similar, but reversed in direction.

In the foregoing statements and remarks with a view to a clear explanation of the gyroscopic laws, the gyroscope referred to is one which is so balanced that its centre of gravity is in coincidence with its point of support. Such an instrument would be of no practical value in navigation, as it would be almost an impossibility to know whether its axis was in the vertical, or otherwise. Therefore the gyro intended for use in this case is one which is so constrained that it will naturally seek the vertical with its axis; that is to say the centre of gravity of the gyro should be positioned either above, or below its point of support. To have the gyro's centre of gravity above its point of support although correct in theory, is not good in practice, as owing to sinkage of the wheel due to ordinary wear and tear, it is possible for the centre of gravity to coincide eventually with the point of support; in which case, the gyro although apparently spinning to perfection would be registering an error unknown to the observer. For this reason, the gyro used in connection with this invention will preferably have its centre of gravity below its point of support.

In the case where a gyro so balanced has its axis displaced from the vertical by an applied force, then when the force is removed the gyro will immediately commence to precess, with the endeavour to bring its axis again into the vertical. This endeavour takes the form of a steady precession in the opposite direction to that in which the gyro is spinning, during which the gyro-axis traces out a spiral in space, each winding of the spiral bringing the axis nearer to the vertical until the gyro finally comes to a position of apparent rest. This precession of the gyro has such corrective effect that it almost eliminates the error caused by the rotational precession.

The purpose served by the gyroscopic laws may now be defined as follows: Whilst fixity in space serves to so stabilize the gyro that it can successfully throw off the effect of disturbing influences such as arise from the rolling, pitching, and other motions of a ship at seat, precession tends to bring the axis of the gyro back into the vertical, whenever it is deflected therefrom.

Now, with respect to the earth's rotational direction, it may be said that there is only one correct way in which to spin the gyro, namely, such that will cause the gyro's precession to take place in the same direction as that manifested by the rotational precession. This means that a gyro balanced with its centre of gravity below its point of support should be rotated "left-handed," or against the hands of a watch, in the northern hemisphere; and "right-handed" in the southern hemisphere, these rotational directions being as seen when looking down upon the upper plane surface of the wheel. Under such spinning conditions, a gyroscope will attain its greatest steadiness of action.

The effect of the earth's rotation upon the gyro balanced and rotated as intended may now be considered. In the first place, the rotational precession will cause a depression of the western edge of the wheel, with the result that the gyro's centre of gravity is displaced from beneath its point of support and to the eastward, when the earth's gravitational force is brought into play in the nature of a downward pull on the eastern edge of the wheel. This new force will therefore tend to rotate the gyro bodily about a north and south axis, and that with a direction of spin from west to east through the upper part of the revolution; and according to the law of precession, the gyro—which we assume is spinning "left-handed" in the northern hemisphere—will respond by depressing the northern half of its upper plane surface below te true horizontal and so bring its axis of spin nearer to the new axis of rotation, and its direction of spin from west to east when looking upon the southern—which is the higher—half of the wheel's plane surface.

The degree to which the upper plane surface of the gyro is deflected from the true horizontal is actually what remains of the error caused by the rotational precession, after such error has been eliminated, as far as possible by the gyro's precession. This remainder constitutes the correction for the earth's rotation, which must be applied to all altitudes (excepting those of bodies bearing east or west of observer), and it may be named the rotational correction.

Now, there is another correction which must be applied to all altitudes measured whilst the gyro itself is in a state of precession due to its axis being abnormally inclined from the vertical, and this may be named the precessional correction. Methods whereby the rotational and precessional corrections can be found, and applied to an altitude, will be explained later.

There are still two further points to be considered in connection with the gyro, namely, its period of precession, and its velocity of spin. With regard to the gyro's period of precession, (i. e., the time which it takes when spinning to make a complete round about the vertical with its axis) this is partly decided upon with consideration to the rolling period of a ship as the spinning gyro must not be so influenced as to synchronize to any appreciable extent with the ship's motions in a seaway. The work synchronize as used here, does not mean that the spinning gyro will be influenced by the rolling of a ship in the same way that a pendulum would be influenced under the same conditions. In effect, if a ship rolls to starboard and so causes the upper end of the gyro-axis to incline towards her stern, then, when she rolls to port the upper end of the gyro-axis will incline towards her head, and both movements, will be in accordance with the law of precession. Now, when the gyro's point of support coincides exactly with its centre of gravity, then the rolling motions of a ship can have no influence whatever on the verticality of its axis; but as the distance between its point of support and centre of gravity is gradually increased, so will the influence of roll be increasingly manifested. Thus when the gyro's point of support is displaced only a very small distance away from its centre of gravity, then the inclination of axis produced by the ship's roll will be so small as to be a negligible amount so far as practical navigation is concerned, and under this condition it is intended that the gyro will be used. A factor which may be employed as representing the value of the distance between the gyro's point of support and its centre of gravity, is its period of precession. This period increases as the point of support is brought nearer to coincidence with its centre of gravity, and it also increases as the velocity of spin is increased, and vice versa. It must be remembered, however, that observations will be required whilst the gyro may be precessing, and therefore the period of precession must not be made too long. A period of between two and three minutes will prove satisfactory so far as effectively stabilizing the gyro is concerned and will prove suitable with regard to the taking of observations.

When deciding upon the nature of the power to be provided for the driving of the gyro wheel, it must be remembered that the sextant will be attached to the instrument for observations to be taken and consequently, there should be no vibration present such as would detrimentally effect the more or less delicate adjustments of the sextant glasses. Therefore, although the gyro may be arranged to be continuously power driven, in order to obviate probable sextant errors due to vibration it is preferable that the gyro should be arranged to spin by energy initially impressed upon it, that it should be so spun and manipulated that when sufficient velocity of spin has been obtained, it can be uncoupled from the driving force, and the wheel left free to spin of its own accord in a suitable means of support. The initial velocity of rotation given to the gyro should be sufficient to enable it to spin effectively for a period of say, fifteen minutes, which will be ample length of time for the taking of any ordinary observation.

*The means whereby direction is indicated.*— This method of direction indicating is explained with reference to Figure 2. In this figure, the inner circle represents the transparent globe, as in Figure 1, with O the "point of observation," C the center of the reflecting surface, and H the horizontal line. The artificial horizon line R is not shown, but it is understood to lie immediately below H.

The outer graduated portion represents a ring of direction which encircles the globe, say, on a level with WL.

X is the position of a body which has just been observed.

Then it is obvious that the vertical plane which passes through O, C, H, R and X will intersect the ring of direction at the bearing of X. In the figure, the bearing of X is seen to be north 39° west.

From the above it will be seen that the reflected image of H not only forms an artificial horizon line, but provides a "line of alignment" or "sighting line" whereby direction can be shown as here illustrated.

In the completed instrument, it is intended that the bearing of X will be read from that side of the ring of direction which is adjacent to O.

*Description of instrument.*—It will now be explained with reference to Figures 1 and 2, how the above principles can be embodied in an instrument of the horizon and direction indicating type.

In one example to be described, the reflecting medium WL can be in the form of the upper plane and polished surface of a small gyro wheel. The gyro is contained in a case, and is so controlled therein that it can be either clamped, clutched or supported in a freely spinning position. The clamped position is used when it is desired to fix the gyro wheel so that the instrument can be safely transported overland. In the clutched position the gyro is held so that it can be given a high velocity of spin, and then instantly released into its freely spinning position.

When in the free position, the gyro is supported with its spinning point in a small hemispherical shaped cup, so that the spinning gyro can maintain its axis in its natural direction in space, regardless of how the case is moved or inclined during the time of an observation.

The position indicated by the point H is occupied by a screen, on which is shown a central horizontal line the reflected image of which line forms the artificial horizon, and with other divisional lines above and below the central line.

The point O is the "point of observation", say, at the centre of the telescope eye-piece of the attached sextant.

The points H and O are held in position with relation to the gyro by means of suitable arms which are fitted rigidly to the case, and are equally distant from the centre of the cup shaped support of the gyro wheel. The centre of this cup is indicated in Figure 1 by the letter C, and in the instrument it is the common centre about which the suspended parts move, turn, or rotate. As the case forms the foundation or support for various important parts it is strongly constructed, and preferably is made so that it constitutes an airtight compartment from which the internal air can be extracted, thus reducing the resistance of air on the spinning gyro and thereby considerably lengthening its effective period of spin.

Suitable windows are fitted in the upper part of the case through which the spinning gyro and the artificial horizon line can be seen.

A small spirit level, fitted to any convenient part of the case, indicates to the observer whether the axis of the gyro was near the vertical, or otherwise, at the instant when the wheel was released from the clutched position to spin freely of its own accord.

Now, especially if the gyro is unevenly balanced about its spinning axis, or unevenly held by the clutch, it may on occasions be seen to spin with an apparent vibrative movement upon being released from its clutched to its free position; and in order to eliminate this apparent vibration (which causes a hazy artificial horizon), suitable means may be provided inside the top of case.

The case with its various attachments is held rotatable through azimuth in a set of gimbal rings, which rings are in turn held in a suitable fork-shaped support.

The inner ring of the gimbals holds in position the means for indicating direction, and on this gimbal is also shown the instrument's lubber line.

The means for indicating direction takes the form of an azimuth ring or dumb compass card, in combination with the lubber line above mentioned, and with a pointer which is fitted on to the case. The azimuth ring may be made up in two ways, i. e., it may be fixed relatively to the gimbal ring which holds it in position, or it may be rotatable about the centre or axis of that ring. The rotatable ring, being the most perfect from a navigational point of view, will be described in this specification; and with this ring, part of a diagram, (as in my British Patent No. 167,075,) may be conveniently shown, and used so as to easily convert "compass bearings" into "true", and vice versa, thus obviating the risk of error so far as the conversion of bearings is concerned. In order to facilitate the rapid noting of bearings from the azimuth ring, the directions as shown on the ring are reversed in relation to the direction as indicated by the ship's compass. That is to say, the instrument's lubber line is positioned aft of its centre—thus when the azimuth ring is set to correspond with a "compass" or "true" course, that course reading is shown by the ring towards the stern, and not the head of the vessel. Such arrangement permits an observer to read off the bearing of an observed object from that side of the azimuth ring which is adjacent to him. Also, numerals and the like are so engraved on the azimuth ring as to be readable from outside the ring.

A fork-shaped support of the gimbal rings is held in a standard which is fitted on to the ship's deck in a suitable position for observation purposes with the plane of the fork in the ship's fore-and-aft line. Means such as shock absorbing springs may be provided in the standard, whereby the vibrative effects of the ship are neutralized as far as possible, and the instrument can be adjustably held as far as height is concerned.

In order to give the gyro the necessary velocity of spin, it is preferable for a small electric motor to be provided, but if the instrument is intended for use in a ship not supplied with electrical installation then suitable mechanical or like means may be employed to spin the gyro.

A small lamp for the purpose of lighting up the horizon screen at night, may be supplied with the instrument.

In ordinary practice the azimuth ring is set to indicate the ship's true course. The gyro is then spun, and the sextant attached, with the axis of its telescope directed in the vertical plane through the object to be observed. By moving the index arm of the sextant the observed object is brought into coincidence with the artificial horizon and the sextant reading noted. This reading, when corrected as will later be explained, will be the true altitude of the observed body. The bearing of the observed object will be the reading of the azimuth ring in coincidence with the pointer at the instant of observation.

*Details of construction.*—The construction as herein particularly given, is only one of several ways in which the apparatus can be designed and arranged in order to embody the principles already explained. Variations of this example are possible and certain of these will be mentioned later in the specification.

In order that the invention may be clearly understood and readily carried into effect, an embodiment will now be described more fully with reference to the accompanying drawings.

In the drawings, Figs. 1 and 2, as before stated, illustrate the principles of the invention, Fig. 1 being a side elevation of a globe illustrating the optical feature and Fig. 2 a plan of the same globe illustrating the method of indicating direction.

Figure 3 is a vertical section taken through the center of the case and internal parts, looking from front to back;

Figure 4 is a vertical section taken through the center of the case and internal parts, looking from side to side;

Figure 5 is a horizontal section taken through the case;

Figure 6 is an elevation of the case looking from the left side, toward the clutch mechanism;

Figure 7 is a plan of the instrument;

Figures 8 and 9 are plan and sectional views illustrating the horizon screen;

Figure 10 is a side elevation of the instrument;

Figure 11 is a plan view and part horizontal section illustrating the top of the standard by which the fork is supported;

Figure 12 is a plan of the instrument, the horizon screen and sextant supporting arms being broken away;

Figure 13 is a vertical section taken through the gimbal rings and adjacent parts;

Figures 14 and 15 illustrate a modified form, Fig. 14 being a vertical section taken through the center of the case and internal parts looking from front to back, and Fig. 15 a like vertical section looking from left to right.

All the above mentioned figures are to the same scale, with the exception of Figures 7, 10 and 11, which are reduced. These latter mentioned figures are to a scale which is equal to 4/10 the scale of the others.

Figures 16 to 21 are diagrammatic views of a theoretical nature, and are used in explaining the apparent action of the artificial horizon line and the formulæ employed in finding certain corrections. These figures are not drawn to any particular scale.

Finally Figure 22 illustrates a marking on the gyro surface.

The terms "front," "back", "left," "right," and the like, will be understood upon referring to the drawings. It will be seen that the sextant arm 28 (Fig. 7), extends over the back of the instrument, and is attached to the right side of the case; while the horizon screen arm 30 extends over the front of the instrument, and is attached to the left side of the case.

Throughout the drawings, similar parts are marked with like reference numerals. It will be assumed whilst describing the construction, that the reflecting medium is always in the true horizontal plane.

The gyro 1 is depicted in Figures 3 and 4. It preferably consists of three parts, namely, the body, the spinning point holder, and the spinning point. The body of the gyro is shown of partly spherical shape, with a somewhat conical opening in its bottom part. The disc-shaped spinning point holder 1ª is screwed upwards into the body of the gyro at the top of the conical opening. The spinning point 1ᵇ shown as a small screw, is firmly held screwed into the spinning point holder. The spinning point holder and the spinning point should each be provided with slots for adjusting purposes; and suitable screwdrivers for engaging in these slots, should be provided with the instrument. The complete gyro is made up of the three parts mentioned in order that when the spinning point has become worn and blunted it may be easily removed and replaced by a new one. The body of the gyro should be made of a suitable hard and strong non-magnetic metal and the spinning point holder and the spinning point may be made of steel. The spinning point should be so tempered that it combines toughness with hardness, but it should not be as hard as the cup-shaped support in which it spins. All parts must be made so that the gyro is evenly balanced about its spinning axis. The upper surface of the body is intended to act as a mirror, and therefore must be perfectly plane and highly polished. This fine degree of polish may be attained by electro-plating the surface concerned or by other suitable means. It is preferable however that the whole of the plane surface of the gyro should not be polished, but that a dulled or blackened portion 64 as shown in Figure 22 should appear at or near the edge of the surface on one side of its centre line so as to enable an observer to tell whether his gyro is spinning at a high, or low speed. A fairly high speed is essential for good observation purposes, and under such spinning conditions the dulled portion 64 of the surface will not be noticeable, but when the spinning gyro has slowed down to such extent that its speed is insufficient to ensure good stability then the flickering appearance of the light from its polished surface, caused by the momentary appearance of the dulled portion before the eye, will intimate to the observer that his gyro requires respinning.

In order that the gyro may be easily removed from its case (required when changing its spinning point, or so as to oil the moving parts), a suitable pair of tongs should be provided with the instrument, the tongs being so shaped that they will grip firmly on opposite sides of the gyro.

The gyro 1 is contained in a strong metal case 2 which can conveniently be made in box form. As the case 2 forms the foundation of a number of important parts, it must be strongly made, and preferably should be constructed with a view to its being made airtight so that the internal air can be extracted when required. Particular points to note in the design of the case 2 will be understood as the other parts in connection with it are described.

At the bottom of the case 2 is a strong bearing 3, in which a vertical spindle 4 is rotatably held.

The bearing 3 may be shaped as indicated by Figures 3 and 4, its upper end being cup-shaped so as to collect any oil which may be thrown out from the rotating parts by centrifugal action, while its lower end is externally threaded and projects below the bottom of case 2. The bearing 3 when once screwed into position in the bottom of case 2, may be soldered or otherwise permanently fixed in that position.

The upper end of the vertical spindle 4 is bored out so as to hold firmly screwed in position a hardened steel part 5. The upper end of part 5, which forms the support of the spinning gyro, is cup shaped, the inside surface of the cup being accurately spherical and highly polished. This portion of part 5 should be hardened to an extreme degree of hardness, so as to obviate wear of a material amount being caused by the spinning point of the gyro. The centre of the cup's hemispherical surface, which lies in the axis of the spindle 4, may be considered as being the common centre about which the combination of moving parts moves or rotates. Preferably, the part 5 will be adjustably held in the vertical spindle 4. In Figures 3 and 4, it is shown screwed into the bored out part of the spindle 4, where it is held in position by a lock nut. The spindle 4 rotates on a ball race 6 and is prevented from moving vertically in the bearing 3 by a collar 7. As shown in Figure 4, the collar 7 is secured to the spindle 4 by a small pin 4ª.

A vertically sliding clutch 8 (Figures 3, 4 and 5) has a cup-shaped head moulded to fit gyro 1 exactly, and a sleeve 8ª which fits slidably on the spindle 4, on which it is splined by means of a slot and a feather 9 firmly bedded into spindle 4.

An outer sleeve 10 fits freely but not loosely on the sleeve 8ª of clutch 8, and is held there by a collar 11, which screws on to the lower end of the clutch sleeve.

A vertical feather 12 (Figures 3 and 5) is fitted on to the front outside surface of sleeve 10, and this feather is freely but not loosely held in a guide block 13. The vertical feather 12, when engaging the guide block 13, prevents the sleeve 10 from rotating, but permits it to move vertically in unison with clutch 8. Ball bearings (not shown in the figures) may be provided in order to reduce the frictional resistance between the clutch 8 and sleeve 10, if desired.

A vertical toothed rack 14, carried on the sleeve 10, engages with the teeth of a wheel 15 which is mounted on a horizontal spindle 16 (Figure 5) carried in bearings in the case 2. A small collar is shown pinned on to the right end of the spindle 16 by means of which the spindle is held in position at that end, and the case 2 is made airtight at this point by means of a cap 17. A disc-shaped part 18 is permanently fitted on to the left end of the spindle 16. Surrounding the disc 18 a collar 19 is permanently fitted on to the left side of the case 2. The outside surface of this collar is provided with a left-handed screw thread, and on to this is screwed a cap 20. This cap is formed with a central circular aperture, through which the left end of the spindle 16 protrudes, and the screw rim formed on the cap is of such depth as to allow of the cap being screwed on till its flanges part presses tightly on the disc 18.

The disc 18, collar 19, and cap 20 are intended to form a combination whereby an airtight joint can be formed at this point of the case 2, when desired. A suitable rubber or leather washer may be utilized here in order to ensure perfect airtightness, or the surfaces concerned may be so ground that the employment of a washer is unnecessary.

As illustrated in Figure 5, the left end of spindle 16 is of tapered form, and ends in a left-handed screw threaded part. On to this taper is fitted a strong milled-headed knob or handle 21 (Figures 5 and 6), and this knob is firmly held jammed on the spindle 16 by a lock nut.

Catches 22 are permanently fitted on the handle 21. These catches are so formed that they overlap the cap 20, and their ends extend towards the side of case 2.

A trigger 23, held in a casing of its own which is attached to the side of the case 2, is surrounded by a spiral spring which presses it continually outwards, and this trigger engages in turn with each of the catches 22, as the handle 21 is turned. In Figure 6, one catch is seen to be marked Clutch, and the other marked Clamp; which indicates that the gyro 1 is held in the clutch 8 ready for spinning when the clutch catch is held by trigger 23; and is firmly clamped when the clamp catch and trigger are in turn engaged. When neither catch is held by the trigger, then the gyro is in its free position with its spinning point supported in the small hemispherical cup at the upper end of part 5.

In order to remove the gyro from its free to its clutched position, turn handle 21 until the clutch catch is held by trigger 23, when the gyro will be resting in the cup-shaped part of clutch 8, and in this position its spinning point should just be free of contact with the surface of the cup of the part 5. To remove the gyro from its clutched to its clamped position, the handle 21 is further turned until the clamp catch engages with the trigger, when the gyro will be held firmly between the clutch 8 and the top of the case 2.

To reverse the above operation it is only necessary to press the trigger 23, when the force of gravity acting upon the gyro and clutch will cause them to sink to a lower position.

Thus, the wheel 15, spindle 16, handle 21, catches 22, and trigger 23 form a combination whereby clutch 8 is operated as required, accordingly as it is desired to clamp, clutch, or permit the gyro to spin freely.

An arrangement is also provided to form an airtight joint where the spindle 4 protrudes through the bottom of the case 2. Here, as indicated in Figures 3 and 4, the ring shaped part which projects from the bottom of the bearing 3 is provided with a right-handed screw thread on its outside surface and over this ring a cap 24 is screwed. The cap 24 is formed with a central circular aperture through which the lower end of the spindle 4 protrudes. The screw rim of the cap 24 is of such depth that when the cap is screwed tightly down till its flange presses on the collar 7, its rim will not be quite in contact with the bottom surface of the case 2. A suitable rubber or leathern washer may be placed between the cap 24 and the collar 7 so as to ensure perfect airtightness; or the surfaces concerned may be so ground as to make an airtight joint by direct contact between themselves.

The lid 25 is also in the form of a disc-shaped cap, and screws on over a screw rim (Figures 3 and 4) on the upper surface of the case 2. A suitable washer should be provided so as to ensure airtightness at this point. The bottom surface of the lid 25 may be covered with soft leather or other suitable material, in order to prevent scratching the polished surface of the gyro 1 when it is held in a clamped position.

In order that the reflecting surface of the gyro, and the artificial horizon line can be seen by the observer, two small windows 26 are provided, one at the front and one at the back of the upper part of the case 2. The positions of these windows are particularly indicated in Figures 3, 7 and 12. They are shown in Figure 3 to be inclined from the vertical at an angle of 20 degrees so as to permit the rays of light to pass perpendicularly through them from the gyro's polished surface to the observer's eye, thus avoiding any material refractional error. The windows are held in suitable openings in which they rest on supporting ledges. They must be so cemented, or otherwise effectively held, that the case 2 is also airtight at these points. The windows preferably should be made of a suitable good quality glass, the surfaces of which are perfectly plane and parallel to each other. In Figure 7, the vertical plane which passes through the common centre of the instrument and parallel to the right and left sides of the case 2, is indicated by a dotted line through the centre of the figure, and this plane is seen to pass in contact with the right sides of the windows.

Surrounding the case 2, and positioned as shown by Figures 3, 4, 6, 7 and 12 is a strong metal platform 27. This platform has its centre portion cut out to the shape of the horizontal section of the case 2. It is then placed or fitted over the case, and the two are rigidly attached together.

A part which may be named the sextant arm 28 is illustrated in Figures 7 and 10, in which figures the attached sextant is indicated in dotted outline. The arm 28 is permanently attached to the right side of the case 2, above the platform 27, and extends over the back of the case. The length of the arm 28 must be sufficient to permit of the sextant being manœuvred as required during an observation without any part of it coming in contact with the fork-shaped supporting frame (described later). As indicated by Figure 7, the sextant arm is so shaped that the vertical plane which passes in coincidence with the right sides of the windows 26 and through the common center of the instrument, will pass through the horizon glass of the sextant between the silvered and unsilvered portions, and through the axis of the sextant telescope. In Figure 10, the sextant arm is shown raised above the horizontal at such an angle that the sextant's telescope axis is directed towards the common center of the instrument, forming an angle of 20° with the true horizontal.

As there are many designs of sextants on the market, the arm 28 must be made with due regard to the design of sextant which is intended to be used in connection with the instrument. It is possible that the arm will have to be bent or altered in shape in comparison with the form as illustrated; but whatever the shape of the arm, it should be such as to prevent undue stress or strain being put upon the frame of the attached sextant, and the arm as illustrated is shaped with such object in view. Here it is seen that there are two horizontal grooves or sockets formed in the arm, one groove 28ª being across the back end of the arm, and the other 28ᵇ across its upper surface. The first mentioned groove is intended to hold in position the strong leg of the sextant telescope collar; and the second groove is to hold the upper strut which connects the sextant handle to its frame. In order to attach the sextant, the arm 28 is first of all entered between the sextant handle and its frame, and the leg of the telescope collar is positioned in the groove 28ª made for it across the end of the arm. The sextant is then moved until the upper strut of its handle rests in the groove 28ᵇ formed across the upper surface of the arm, when a small slideable bolt 29, or other suitable means is employed to lock the strut, thus holding the sextant immovable in relation to the arm 28.

Although the sextant telescope does not form part of this invention, it may be mentioned that a telescope of the blank tube type will be found suitable for the required purpose; the "point of observation" being a pinhole made through the center of the eye-piece of the telescope.

Another arm, which may be named the horizon screen arm 30, is rigidly attached to the left side of the case 2, above platform 27. This arm is illustrated in Figures 7 and 10, and in Figure 10, it is seen to be raised above the horizontal at an angle of 20°. The arm 30 is of such length that the distance between the common center and the horizontal line on screen 31, is equal to the distance between the common center and the "point of observation". The length of arm 28 may therefore be said to govern the length of the arm 30.

The horizon screen 31 is fitted perpendicularly to the outer end of the arm 30, and so that the line which joins the central horizontal line on the screen with the common center of the instrument will make an angle of 20° with the horizontal. The horizon screen preferably should be made of a good quality glass, and be designed to conform to the following requirements:—

The width of the horizon screen from left to right must be such that when attached to the arm 30, the vertical plane which passes through the right sides of the windows 26 will also pass through the right side of the screen. The depth or height of the screen from top to bottom should be sufficient to permit of at least 12 degrees of arc being shown on its inner surface—degrees which conform to a radius equal to the distance between the "point of observation" and the common centre of the instrument. This radius is represented in Figure 1 by the distance OC. The outer or front surface of the glass which forms the horizon screen may be perfectly plane, and should be ground or dulled so as to act as a diffuser for the light which passes through it to the inner or back surface. The inner or back surface of the screen should be shaped so as to conform to the inside surface of a hollow cylinder, the radius of which is represented in Figure 1 by the distance OC. Figure 9 is a section through the screen, and indicates the plane and curved surfaces mentioned above. The inner curved surface preferably should be stained in two distinct colours, the division line of the colours being horizontal and dividing the screen into exactly two halves. The division line thus shown may be termed the screen horizon line, which line is indicated by H in Figures 1 and 2. Above and below the screen horizon line are other lines which further divide the screen into equal intervals representing, say, 20 minutes of arc each, in conformity with the radius which governs the curvature of the screen. The dividing of the horizon screen is illustrated by Figure 8. With reference to the marking of the different divisional lines, it must be understood that they are not marked as above alluded to, but marked as if they conformed to a radius equal to the distance OR in Figure 1. For example the division line which represents 20 minutes of arc in accordance with the curvature of the screen, is marked as 10; the 40 minute division line is marked 20, and so forth. Therefore, although there may be actually 6 degrees of arc above, and below the screen horizon line, there are only 3 degrees indicated by the marking on each respective half of the screen. The numbers used for marking purposes should be shown in minutes of arc only; e. g., 10, 20, 30 and so on, up to 180 minutes on each half of the screen. The screen horizon line is, of course, the zero point. Further, the upper half of the screen is marked with a minus sign, and the lower half with a plus. During the process of marking the screen 31, it must be remembered that the screen is shown to the observer by reflection, and in consequence is seen inverted, with the plus sign uppermost, and the minus sign lowermost. The numerals used for marking purposes are therefore engraved upside down on the screen, as illustrated by Figure 8. The divisional lines and other markings on the screen above and below the horizon line are for the purpose of facilitating the taking of observations whilst the gyro is in a state of precession (as will later be explained); and when so arranged and marked, the horizon screen really forms a complement to the arc of the sextant.

A strong metal shade (not indicated in the figures) should be fitted so as to extend from above the front window 26, to above the horizon screen, thus shading the screen so that the rays of light from it cannot reach the observer's eye directly but only by reflection from the gyro's polished surface. The right hand edge of this shade will terminate at the vertical plane indicated by the dotted line in Figure 7.

In order to provide the high velocity of spin required by gyro 1, it is preferable for an electric motor 32 to be used. The motor must be made with regard to the nature of the electrical installation of the vessel in which the instrument is to be used, and its speed must be sufficiently high to provide the gyro with good initial velocity of spin, preferably not less than 2000 revolutions per minute. As illustrated by Figure 10 of this example the motor is shown to operate with its spindle in the vertical, and it is intended that the direction of rotation it gives to the gyro will be left-handed in the northern hemisphere, and right-handed in the southern. In order to get these directions of rotation, the end of the motor spindle which rotates left-handed (as seen when looking down upon it) will be used uppermost in northern latitudes and lowermost in southern latitudes. So as to obviate mistakes being made, such as driving the motor with the wrong end of its spindle uppermost, the ends of the motor casing are marked N. and S. in accordance with the direction of the spindle's rotation; e. g. N. for left-handed rotation, and S. for right-handed. These markings are indicated in Figure 10. In lieu of the above method of reversing the gyro's direction of rotation, a reversing switch can be provided to the motor, in which case the respective positions of the switch should be marked N. and S. according as the spindle rotates left-handed or right-handed. Preferably, an electric switch, by which the current can be switched off and on as required, should be arranged within easy reach of the observer at the instrument.

A cage 33, which is rigidly attached to the front and back of the case 2 (Figures 3 and 10), holds the motor 32 in position by means of axial screws 34. These screws engage in suitable openings in the case of the motor, in such manner that the motor can be easily inverted when necessary. The upper end of the motor spindle is coupled to the lower end of the spindle 4 by a coupling 35. Both spindle ends preferably should be of the same diameter and, as shown by Figure 3, the coupling 35 is secured to the spindle ends by means of small grub screws. The coupling 35 should be of such depth from top to bottom that when the grub screws are released from the spindle ends the coupling can be raised over the spindle 4 till it is clear of the motor spindle end. Thus the motor can be inverted without it being necessary to interfere with the axial screws 34.

A knob 36 (Figure 10) which is preferably square in section, projects from the bottom of the cage 33. This knob is to connect the movable parts of the instrument to the fork-shaped frame (described later), so that the parts concerned are immovably held with relation to each other.

Preferably a small spirit level 63 shown in Figures 4 and 12 should be attached to case 2 at any convenient point. As shown it is attached to the lid 25. This level is for the purpose of advising the observer whether his gyro is suitably positioned with relation to the vertical at the instant when he is about to release it from its clutched to its free position.

A small pointer 37 shown in Figures 12 and 13 is attached to the upper surface of the platform 27, adjacent to the sextant arm 28, so as to be in the vertical plane which passes through the right sides of the windows 26 and the common centre of the instrument. This pointer is used in conjunction with the azimuth ring, as will later be understood.

The means for extracting the internal air from the case 2, may consist of a non-return valve 38 (Figure 4) in combination with an air pump of suitable make. As shown, the non-return valve consists of a vertical tube in the narrowed lower end of which a ball valve rests. This vertical tube is fitted to a horizontal tube, and the horizontal tube is screwed through the case 2, its outer end projecting sufficiently far beyond the outer surface of the case to allow the nozzle of the air pump to be securely coupled thereto. A small cap (not shown in the figures) held to the case 2 by a short length of chain, can be used to close the outer end of the horizontal tube when the nozzle of the air pump is unattached. The air pump (not shown in the figures) may be made somewhat on the design of a bicycle pump, but so that its effect is the opposite. That is to say, when the handle of the pump is pulled out, then the pump will fill itself with air through its nozzle, and as the handle is pushed in, the air inside the pump will be expelled through a small non-return valve positioned on the body of the pump near its nozzle end. The nozzle of the pump should be made of flexible substance, and it must be provided with suitable means whereby it can be securely coupled on to the outside end of the horizontal tube of the non-return valve 38. The non-return valve 38 prevents the air from re-entering the case 2 when once it has been drawn from the case into the body of the air pump.

By means of the platform 27, the combination of parts hereinbefore described is supported in a gimbal ring 39 (Figures 12 and 13) in such manner as to be freely turnable through azimuth. This gimbal is formed with a concentric groove in its upper surface, and in this groove the azimuth ring 40 is rotatably held. The lubber line of the instrument is shown on the upper surface of the gimbal ring 39; also, the course correcting diagrams, with their small E. and W. arrows (somewhat as in my British patent specification 167,075, of July 16th, 1920), may be shown in the vicinity of the lubber line. The lubber line is indicated in Figure 12 by a thick black arrow head, and the course correcting diagrams are shown, one on either side of the lubber line.

The azimuth ring 40 is meant to represent a compass card, and preferably should be graduated into degrees from 0° at north and south, to 90° on east and west. The numerals which indicate the degrees should be so engraved on the ring that they are readable from outside its rim. This method of engraving the numerals is indicated by Figure 12.

The gimbal 39 is pivotably supported by means of axial screws 41, in an outer gimbal ring 42, and the gimbal 42 is in turn pivotably supported by axial screws 43, in a fork-shaped frame 44 (Figures 10, 12 and 13). The point of intersection of the axial lines of the gimbals should coincide with the common centre of the instrument. This method of suspension permits the instrument to be operated about the common centre, and thus obviates any displacement of the gyro when spinning, such as by a movement on the part of observer.

As shown by Figure 10, the frame 44 is expanded at its lower part. This expansion is in order that the suspended parts can have a freedom of movement from the vertical in the vertical plane through the frame of, say, 20 degrees, thus preventing undesirable contact between the frame and the moving parts when observations are being taken whilst the ship is pitching heavily.

A knob 45, similar in section to the knob 36, is formed on the upper surface of the bottom part of the frame 44, and on knob 45, a slideable coupling 46 is situated. The coupling 46 is for the purpose of holding the knob 36 and the knob 45 firmly clamped together, thus holding the case 2 and the frame 44 immovable with relation to each other, when the apparatus is out of use. The coupling 46, although slideable vertically over the knob 45, should be permanently attached thereto, and this condition may be provided for by having a vertical slot through the knob 45 from front to back, when the coupling 46 can be attached to the knob 45 by a pin which passes from front to back of the coupling through the slot. The vertical measurement of the slot should be such that, when the coupling is raised till the pin which holds it to the knob 45 is in contact with the upper end of the slot, then one half of the coupling will be positioned over the knob 36. A milled headed clamping screw, or other suitable arrangement (not shown in the figure) must be provided, by means of which the coupling 46 can be securely clamped to the knob 36, when desired.

Projecting vertically downwards from the lower surface of the frame 44, is a leg 47.

This leg preferably should be square in section, and about two feet in length. The upper nine inches or so of the leg, immediately below the fork, should be drilled with a number of horizontal left to right holes, by means of which, as will be later understood, the instrument is made adjustable to suit the height of the observer.

The parts just described are held in a standard 48 (Figures 10 and 11), which may be made as a strong metal or wooden cylinder of any suitable diameter. This cylinder should have a flanged lower end by which it can be bolted securely to the ship's deck; and when bolted to the deck, the centre line of the cylinder should be in, or near the vertical when the ship is upright and in good trim.

The leg 47 is supported in the standard 48 by means of two platforms 49. One of these platforms is positioned at the top of the standard 48 as indicated in Figure 11; and the other is positioned inside the standard, about one foot from the top. The platforms may consist each of a disc-shaped piece of metal of suitable thickness, the centre portion of which is cut out to conform with the horizontal section of the leg 47, so as to allow the leg being freely but not loosely held in these openings. Both platforms may be held in position in the standard 48 by means of spiral springs 50—the object of these springs being to minimize the effect of jar or concussion caused to the instrument by the heavy plunging of the ship, or by her vibration. The upper platform 49 is provided with vertical lugs 51, and each of these lugs is provided with a horizontal left-to-right hole oppositely positioned to each other. The diameter of these holes conforms to the diameter of the holes through the leg 47.

The instrument when adjusted to a certain height is kept at that height by means of a bolt 52, which passes through the holes in both lugs and leg, when the holes concerned are in alignment with each other. The bolt 52 may be attached to the platform by a short length of chain.

Now, say that the vertical distance between the "point of observation" and the level of the bottom of the frame 44 is 1 foot 10 inches; then if the height of the standard 48 is 2 feet 9 inches from the ship's deck, the instrument will be found adjustable to suit observers varying between 5 and 6 feet in height, which will be a good estimate to work upon as far as the height of an observer is concerned.

The instrument as described should be placed on the ship's navigation bridge in a suitable position for observation purposes, with the plane through the frame 44 in the fore-and-aft plane of the ship, and with the lubber line towards the ship's stern.

Now, especially the gyro 1 is unevenly balanced about its spinning axis, or if it rests unevenly in clutch 8, it will on occasions be seen to spin with an apparent vibrative movement upon being released from its clutched to its free position. In reality, this movement has nothing to do with vibration, but is simply due to the fact that the gyro is spinning about an axis which is not perpendicular to its plane polished surface, and the result is that a hazy artificial horizon line is shown to observer. In order to overcome this apparent spinning defect it is preferable that suitable means should be provided. In the example illustrated (Figure 3) this means is in the form of a fine spring steel wire 53, which is positioned on the right of the front window 26. Two, or more of these wires, positioned opposite to each other may be provided if desired, and their spring and flexibility should be such as to permit of them bending out of the way of the gyro as it is being raised to the clamped position and immediately to spring out into their original form when free to do so. Then, to cause the spinning gyro to rotate about an axis which is perpendicular to its plane surface, it is only necessary to incline the case 2 so that the wire 53 is brought in contact with the upper plane surface of the gyro when the vibrative effect will gradually become less and less, until a perfectly clear artificial horizon line is shown to the observer. When two or more of these wires are fitted they will be found useful at times in regulating the angular amount of the gyro's precession.

A small lamp, preferably lit by electricity, may be provided with the instrument for use on occasions when observations are being taken at night time. This lamp should be arranged to fit in front of the horizon screen 31, so that the rays of light from the lamp will pass through the ground surface of the screen and illuminate the graduated surface with an even diffused light. The sextant shades can be used in the ordinary way to regulate the intensity of the light as required.

The complete instrument above described and as shown in the figures may be modified in detail and in design. For example, the instrument as already explained can be so modified that the clamped position of the gyro is done away with. To have the gyro so arranged that it can be held in a clamped position would undoubtedly be of service were the instrument used on aircraft, but for conditions experienced on seagoing vessels the clamped position would seldom be required.

The gyro wheel itself can be suitable altered in shape. It may be so altered that its centre of gravity is positioned low, in comparison with that of the gyro which is illustrated in the figures already considered. And again in comparison, it may be so altered that its "circle of rotation" is of greater diameter.

In this case, the hemispherical cup-shaped support of the gyro can be made to correspond to a greater radius, say, a radius which is equal to the distance between the centre of the gyro's reflecting surface and its point of support.

Instead of being driven by an electric motor, the gyro may be driven by an arrangement of geared wheels, or by other suitable means. Also, the gyro can be provided with means whereby it may be continuously power driven during the time of an observation.

Further, the frame 44, instead of being held in standard 48 as described, may be provided with suitable legs of its own, in which case the instrument would be of portable nature.

Also, certain parts may be omitted from the instrument as described, such as the spirit level and the airtightening parts.

A modified arrangement is here described with reference to Figures 14 and 15: Generally, in this arrangement, instead of the reflecting medium being the upper plane surface of the gyro, it consists of a disc shaped piece of metal—the upper surface of which is plane and polished—suspended in a gimbal ring (or series of rings) inside the case 2. This disc is so stabilized by a gyro that it will tend to come to rest with its reflecting surface in the horizontal. Provision is made whereby the precessional period of the gyro may be brought within workable limits (say, within 2 or 3 minutes duration); and so that the weight of the disc and attached parts may be suitably and evenly disposed about the line of the spinning axis of the gyro wheel.

In this modification the case 2 is constructed somewhat similarly to that already described. Preferably it is made up in two parts, the upper part, which bears the sextant arm 28 and the horizon screen arm 30, being removably fitted on the platform 27.

As shown in Figure 15 the upper part of case 2 is provided with lugs through which screws are screwed to make the attachment with the platform. The case 2 is provided with V-shaped sockets 54; and a gimbal ring 55 is supported by knife-edged points of suspension in sockets 54, preferably on a left-to-right axis. The gimbal ring, in turn, is provided with similar V-shaped sockets 56, and a disc 57 is supported on a front-to-back axis in the sockets 56.

Surrounding the disc 57, in the vertical plane through its left-to-right axis, is a cage 58. The cage 58 is provided with a vertical screw 59, and the gyro 1 is carried upon a ball bearing 60 screwed into the bottom part of the cage. The upper end of the gyro axle is supported by a suitable bearing fitted on to the lower surface of the disc 57. The lower end of the gyro axle protrudes through below the bearing 60, and this end is shaped with flattened sides so as to engage for driving purposes into a suitable opening formed in the top of the clutch 8. The clutch 8 and sleeve 10 are modified in shape as shown, and as their weight may not be sufficient to ensure prompt disengagement from the gyro axle immediately the trigger 23 is released from the catch 22 (trigger and catch not indicated in these figures), small springs 61 may be provided to create sufficient downward pull to ensure the desired effect. A weight 62 is shown screwed on the screw 59. The purpose of the weight 62 is to raise the centre of gravity of the disc and attached parts, and so neutralize to a workable degree the effect of the preponderance of lower weight caused by the gyro wheel being fitted underneath the disc. By using a heavier (or lighter) weight 62, the gyro's period of precession can be made longer (or shorter) in duration.

Instead of being shaped as shown in Figures 14 and 15, the cage 58 may be formed in the shape of a small dome supported by four equi-distant legs upon the upper surface of the disc 57, and these legs should be so fitted to the disc that the vertical planes through them lie diagonally to the vertical planes through the points of suspension. This method will equally distribute the weight of the disc and attached parts evenly about the spinning axis of the gyro; and in this modification, the gyro can be held in a casing of its own fitted underneath on to the disc 57.

Generally, the gimbal ring 55 should be made as light as possible consistent with strength, and preferably should be suspended so that in itself, it will have no tendency to swing, that is, its centre of gravity should lie in the line through its points of suspension. The centre of gravity of the suspended parts is intended to lie below the common centre of the instrument. The centre of the reflecting surface may also lie in the common centre, and the intersection of the lines through the left-to-right and the front-to-back axis should coincide with the intersection of the lines through the axial screws 41 and 43.

The principle and method of arrangement just described will be found suitable when it is desired to provide a gyro which is continuously power driven. In this method all parts of the instrument (with the exception of the case 2, its gyro and gyro-equipment) may be arranged as already shown. In lieu of the box-shaped case, the case 2 may be of globular or bowl shape, its lower portion being fitted rigidly to the platform 27, and the upper part of the case may be removably fitted on the upper surface of the platform. The lower portion of the bowl shaped case carries a gimbal ring (or rings), preferably neutrally supported and pivotally held by a left-to-right axis, and the gimbal ring, in its turn, carries the disc shaped reflecting surface on a front-to-back axis. Attached to the lower surface of the reflecting disc is the casing of an electrically driven gyro wheel with vertical spinning axis; and the current for driving the gyro wheel may be led in through the bowl shaped case, and along the points of suspension and gimbal ring, until it passes to the motor so as not to create tension or drag such as might interfere with the gyro in its precessional oscillations.

In lieu of the knife edged points of suspension such as are alluded to, ball bearing or other suitable means of suspension may be employed with this instrument.

Having now described the arrangement and combination of parts which form the complete instrument, the following instructions are intended to guide in its working:—

*To spin the gyro.*—When the instrument is fitted with an electric motor for spinning and with a gyro of the kind meant to spin by velocity initially impressed upon it, first of all see that cap 20 and cap 24 are free of contact with the collars 18 and 7, respectively. Case 2 and frame 44 may be disconnected from each other where held by coupling 46. Then place the gyro in its clutched position, and start the motor 32. Allow the motor to attain its maximum speed; then press trigger 23, and so release the gyro to spin freely of its own accord in its cup-shaped support. The position of the bubble in the spirit level at the instant of pressing the trigger will indicate approximately to the observer whether the gyro-axis is near the vertical, or otherwise. Upon release of the gyro, the motor is stopped, and caps 20 and 24 are screwed up tight so as to transform the case 2 into an airtight compartment. The internal air may then be extracted from the case by means of the air pump. On attaching the sextant, the instrument is then in readiness for observation purposes. The working parts of the instrument should, of course, be kept well oiled.

*To change the spinning point of the gyro.*—After having spun for some time, it may be that the gyro will manifest a slight sideways vibration. This vibration is due to the spinning point having become worn and blunted, and it is then advisable to replace the old spinning point by a new one. To do this: unscrew lid 25, and remove the gyro from the case by the special tongs provided. Then unscrew the spinning point holder, and change the spinning point. Make sure that the new spinning point is firmly screwed into the spinning point holder, and that the spinning point holder is in turn firmly screwed into the body of gyro, before again replacing the gyro into the case. When the gyro has been replaced, then screw on lid 25 in a way which will ensure the desired airtight connection.

*To use the azimuth ring.*—Rotate azimuth ring 40 in gimbal 39, till the reading which indicates the ship's course (true or compass as required) is shown at the instrument's lubber line. The pointer 37 will then indicate the direction of any object which has just been observed, on that side of the azimuth ring adjacent to observer.

Conversely, the azimuth ring can be used when it is desired to position the sextant with the axis of its telescope in a certain vertical plane of direction. In this case, the sextant is slued around until the pointer 37 is in coincidence with the azimuth ring reading which indicates the required direction; when the axis of the sextant telescope will be properly positioned.

*To use the course correcting diagrams.*—To change a true course into a compass course use diagram True to compass as follows: Rotate the azimuth ring 40 until the true course reading is in coincidence with the lubber line. Then, if the compass error is easterly (or westerly) turn the ring 40 in the direction indicated by the small E. arrow (or W arrow) until the amount of the error has been allowed for. The azimuth ring reading then in coincidence with the lubber line will be the compass course required.

Diagram Compass to true is similarly used when it is required to change a compass course into a true course.

Previous to explaining the various altitude corrections, and so as to make the reader conversant with terms and the like which will be used in those explanations, the following definitions are now given:—

*The visible horizon.*—The visible horizon is the natural horizon as seen at sea—that point where the sea and sky appear to meet.

*The sensible horizon.*—The sensible horizon is the horizontal plane through the observer's eye, at right angles to the vertical.

*Dip of the sea horizon.*—The angle at the observer's eye between the visible and sensible horizon planes is termed Dip.

*The artificial horizon plane.*—The artificial horizon plane is the plane which passes through the "point of observation" O, and the artificial horizon R, as shown in Figure 1.

In this specification it is assumed that the artificial horizon plane is depressed 20° below the sensible horizon.

*The artificial horizon line.*—The artificial horizon line is the reflected image of the central horizontal line on screen 31. The term Artificial horizon line will be used in the explanations to follow whenever it is to be understood that the artificial horizon line is not at rest in its correct position in the artificial horizon plane—e. g., the artificial horizon line is not at rest when the gyro is precessing.

*The prime vertical.*—The prime vertical is the vertical plane which passes through the true east and west points of the horizon.

*The precessional correction.*—Whilst taking an observation with the aid of this invention, the gyro will be spinning under one of two conditions, namely, in the precessing condition, or in a condition of apparent rest. The precessing condition call for a correction to be applied to the sextant reading in order to reduce, as it were, the artificial horizon line to its true position in the artificial horizon plane. In the condition of apparent rest, there is no such correction necessary; the artificial horizon line having then found its true position in the artificial horizon plane.

It has already been pointed out that during precession the axis of the gyro traces out a spiral path in space, and that in each successive layer of the spiral, the axis nears the vertical. The centre about which the axis turns spirally is the gyro's spinning point of support; and were the spiral path of the axis plotted about the pole of a sphere, it would appear as a rhumb curve (i. e., a curve intersecting all meridians on the sphere at the same angle), gradually nearing the pole at a rate which is proportionate to the length of the successive layers of the curve. To an observer, the gyro's precession is brought into evidence by the apparent movement of the artificial horizon line, which also traces out a spiral path in strict accordance with the path of the gyro-axis. The centre about which the artificial horizon appears to move spirally may be considered as being the centre of the gyro's reflecting surface.

Now, the artificial horizon line whilst tracing out its spiral path appears to incline itself in succession, from, towards, and in the true horizontal. At the highest and lowest turning points of the path, the artificial horizon line will be perfectly horizontal; but from these points it will incline gradually from that horizontal position as it proceeds, until it reaches its maximum degree of inclination when half way between the two points. This will be better understood with reference to Figure 16. In Figure 16, the curved ABC arrow represents the apparent path of the artificial horizon line; and the small lines radiating from the arrow indicate the inclination of the artificial horizon line at successive points in its path. At A, the artificial horizon line is perfectly horizontal; but as it proceeds on its course it gradually inclines from the true horizontal, until when half way between A and B, the maximum degree of inclination is reached. From there, the artificial horizon line begins to right itself, so that when at B, it is again perfectly horizontal. A similar action continues between B and C, and so on, until the gyro finally attains its spinning condition of apparent rest, when the artificial horizon line appears stationary and horizontal. The artificial horizon line being perfectly horizontal at points A, B and C, these points only are considered when taking an observation with the gyro in a precessing condition. Referring to Figure 16, it is evident that the artificial horizon plane must lie somewhere between A and B, near that point in the path where the artificial horizon line reaches its maximum degree of inclination.

Figure 17 will now be considered with a view to explaining the formula employed in finding the amount of the precessional correction. In Figure 17, O is the "point of observation", or the observer's eye at the centre of the sextant telescope eye-piece. OH indicates the sensible horizon; and OR the artificial horizon plane. X is the position of a star to be observed. The dotted circle through A and D indicates the path of the artificial horizon line were it perfectly circular; and the curved ABC arrow indicates that path as it is really found in practice.

Then, considering the first case, where the path is assumed to be perfectly circular, in order to find the precessional correction—which is the semi-diameter of the dotted circle, or the angle AOR—the following simple formula will suffice:

$$\frac{AOX - DOX}{2} = AOR,$$

the precessional correction.

Then, the altitude of X above the artificial horizon plane equals: $AOX - AOR$, or $DOX + DOR$. AOR and DOR are, of course, equal to each other; and therefore individually represent the semi-diameter of the circle through A and D. Thus it is seen that the precessional correction may be an additive, or a subtractive quantity.

But, the artificial horizon's path is spiral, and not circular. Therefore, in order to find the precessional correction in practice, a somewhat different formula must be used. As already pointed out when comparing the path of the gyro-axis to a rhumb curve on a sphere, the artificial horizon line nears its true plane OR at a rate proportionate as the successive layers of its curved path are in proportion to each other, and therefore, $$AOB + BOC : AOC :: AOB : BOD$$

and, $$\frac{AOB + BOD}{2} = AOR,$$

the precessional correction.

Thus, the precessional correction can be found, but it is intended to further simplify the above. Then omitting the letter O from all expressions, $$AB+BC:AB::AB:AR$$
or thus,
$$\frac{AB^2}{AB+BC}=AR,$$
the precessional correction.

The above formula may be used directly for finding AR when the observed body is fixed with regard to the position of the observer—the visible horizon may be quoted as an example of a body so fixed.

With the object of clearly explaining the finding of the precessional correction, and the way in which it is applied to an altitude, the following examples are given:—

*Example 1.*—This example will be explained with reference to Figure 18. The figure represents the reflected image of screen 31, as seen by the observer through the sextant telescope. The central line on the screen is the artificial horizon line, and the other divisional lines are shown above and below it. The plus and minus signs on the screen are used to distinguish the divisional lines above the artificial horizon line, from the divisional lines below it.

In practice, the sextant's index arm is moved until the observed object's image is shown in the sextant horizon glass, near, or in co-incidence with, the assumed position of the artificial horizon plane. The sextant's index arm is then clamped; and as the artificial horizon line reaches point A in its path, final contact is made between the observed object's image and the nearest divisional line on the screen by using the sextant's tangent screw. No further adjustment to the sextant is necessary throughout the observation.

Due to the gyro's precession, the reflected screen will appear to move behind the observed object's image, with the result that a different divisional line will be in coincidence with that image as the A, B, and C turning points of the artificial horizon's path are reached. In Figure 18, the curved arrow ABC represents the amount of movement of the reflected screen, as described by the image of the observed object during the time of the observation; and it is seen that the image is in coincidence with plus 80 at A, with minus 60 at B, and with plus 50 at C.

Then, in order to get the amount of the angular measurement AB and BC, as required by the formula, the screen reading at point A is added to the reading at point B, for the value of the side AB; and the reading at point B is added to the reading at point C, for the value of the side BC.

Therefore, $AB=80+60=140$;
and $BC=60+50=110$.

Then to find the precessional correction AR:
$$AR=\frac{AB^2}{AB+BC}=\frac{140^2}{140+110}=\frac{19600}{250}=$$
78.4 minutes of arc.

When correcting an altitude for the gyro's precession, the following rules are always observed:—

Rule 1. Apply the A reading to the sextant reading:
 (a) Add when the A reading is plus
 (b) Subtract when the A reading is minus.

Rule 2. Apply the processional correction AR:
 (a) Add when the A reading is below the B reading on the screen
 (b) Subtract when the A reading is above the B reading on the screen.

In this example, assuming that the sextant reading is 40 degrees of arc, then the altitude is corrected for the gyro's precession as shown below:—

| | | |
|---|---:|---:|
| Sextant reading, or altitude | 40° | 0' |
| A reading (as per Rule 1) | + 1 | 20 |
| | 41 | 20 |
| AR (as per Rule 2) | − 1 | 18.4 |
| Then the corrected altitude is | 40 | 1.6 |

In the above example, the screen readings are additive in order to get the value of the AB and BC sides of the path. Had the A reading and the B reading been both plus, or both minus, then their difference would have given the required angular measurement AB, and so on.

The application of the A reading to the sextant reading has the effect of altering the sextant reading to what it would have been, had, in the first place, direct contact been made between the observed object's image and the artificial horizon line at point A in the path.

Similarly, the application of AR to the sextant reading when corrected for the amount of reading A, has the effect of giving the correct angular measurement between the observed object's image and the artificial horizon plane.

The above problem and corresponding explanations should prove sufficient to show the method of finding the precessional correction AR, and the rules which govern the correction of an altitude of the gyro's own precession. But, it must be understood that each and every problem may vary in comparison with each other inasmuch as the screen readings will be different on almost every occasion. This will be explained by two further examples:—

*Example 2.*—This example will be explained with reference to Figure 19. As represented by the figure, the A reading is the lowest point on the screen, and B the highest. In this case, according to Rules 1 and 2, the A reading is subtractive from the altitude, and the precessional correction AR is additive.

*Example 3.*—This example will be explained with reference to Figure 20. In this example, as the A reading is zero, there is only the precessional correction to find and apply to the altitude; which correction is seen to be an additive quantity.

It is to be understood that the above examples are in relation to a body which is fixed (e. g., the visible horizon) with regard to the position of the observer. When the observed object is a moving body (the sun, a star or planet is defined as a moving body within the meaning of this specification) then a slightly different procedure must be observed in the finding of the precessional correction AR. This difference in procedure is due to the rotation of the earth on its axis, which gives to all heavenly bodies an apparent movement in space of their own as time goes on; and in consequence, the AB and BC sides of the artificial horizon's path are more or less distorted or altered out of their natural shape, due to the apparent movement of the observed body during the time of the observation. If the side AB is lengthened (or shortened) during the interval of time of the artificial horizon's passage from A to B, then the side BC will be shortened (or lengthened) in accordance with the interval of time which has elapsed during the horizon's passage from B to C. The chronometer times are noted at points A, B, and C in the artificial horizon's path; thus the intervals referred to above are made known when a moving body is observed.

From what has now been said it will be seen that the AB and BC sides of the artificial horizon's path must be individually treated for distortion, previous to the precessional correction being found.

So as to simplify the finding of the change in altitude of the observed body (which is the first requirement in the treatment of the sides of the path), a table which shows the rate of change in altitude, per second of time accompanies the specification. The various rates are shown, each rate as the decimal part of a minute of arc.

To use the table and thence correct the sides of the path, proceed as follows:—

Enter the table with the latitude of observer at the top, and the azimuth of the observed body in the left hand side column, then note the rate of change in altitude.

This rate is found in the latitude column, in line with the azimuth. For example: in latitude 40°, azimuth 30°, the rate of change in altitude, per second of time is seen to be .096.

Then, in order to know the actual amount of change in altitude which must be applied to the AB and BC sides of the artificial horizon's path, the rate selected from the table is multiplied by the interval of time AB, and again by the time BC (both times being expressed in seconds). The result of each problem is then applied to the AB and BC sides respectively of the path as follows:—

Rule 3:
(a) When A is shown above B on the horizon screen, and the star is east of observer:
   Add the time AB result to the side AB.
   Subtract the time BC result from the side BC.
(b) When A is shown below B on the horizon screen, and the star is east of observer;
   Subtract the time AB result from the side AB.
   Add the time BC result to the side BC.
(c) When A is shown above B on the horizon screen, and the star is west of observer:
   Subtract the time AB result from the side AB.
   Add the time BC result to the side BC.
(d) When A is shown below B on the horizon screen, and the star is west of observer:
   Add the time AB result to the side AB.
   Subtract the time BC result from the side BC.

When the sides of the artificial horizon's path are corrected as above directed, the precessional correction is found by using the original formula given above. Strictly speaking there is a small change in altitude due to the ship's own movement during the time of an observation; but this change is negligible in practice.

When the spinning gyro is released from clutch 8 with its axis near the vertical, it will quickly find its resting or sleeping condition with its reflecting surface plane apparently fixed relatively to the sensible horizon. In this spinning condition it is only necessary when taking an observation to bring the observed object's image in contact with the reflected image of the screen horizon line (similarly to making contact between the image of the observed body and the visible horizon in general practice,) when the sextant reading at the instant of contact will be the observed altitude of the body above the artificial horizon plane, and the chronometer time noted at contact will be the time of the observation. In this case, there is no precessional correction to find and apply.

But, a warning may be given here, for to take an observation with the spinning gyro in a resting condition, although an easy operation, is not devoid of risk, as an error may be registered due to a slight precession which cannot well be noticed by an observer. Therefore, in order to minimize and distribute any such error, the mean of two or more observations should be taken when the gyro is spinning in a condition of apparent rest.

*The horizon correction.*—What is termed the horizon correction is indicated by the angle A in Figure 1. This correction may be defined as being the angle at the "point of observation" between the sensible horizon and the artificial horizon plane, this angle being measured in the prime vertical where it cannot be combined with the rotational correction.

To find the angle in practice, proceed as follows:—Set the azimuth ring 40 to indicate true direction, and position the sextant with its telescope axis pointing east or west. The visible horizon's image is then brought in contact with the nearest divisional line on the screen as the artificial horizon line reaches point A in its path and the points A, B and C are carefully noted. The precessional correction is then computed and applied to the sextant reading in the way already explained. This corrected reading is the angle between the visible horizon and the artificial horizon planes. The dip of the sea horizon (given in all nautical tables) is then added to the angle as above, and the sum of the two is the horizon correction required.

When the horizon correction is once found, it is of a fixed amount (providing, of course, that the distance between the gyro's point of support and its centre of gravity is not altered), and is always subtractive from the observed altitudes of bodies which are above the sensible horizon.

*The rotational correction.*—An explanation of the rotational correction will now be given, with reference to Figure 21. Figure 21 represents the earth, WE being the plane of the equator and NS the meridian, or the axis of the earth. The rotation of the earth is from W to E (assuming W to be moving towards, and E away from the reader). G is the position of the gyro when it was started spinning, with its axis parallel to the axis NSQ, the earth. Its position on the meridian is, say 60° north latitude. After a period of six hours has elapsed, due to the earth's rotation, the gyro will then be positioned at J; and assuming that it is uninfluenced by gravity, its axis will then lie in the line JK. Now, as MK (the measurement, as it were, of the lower end of the gyro-axis from the centre M of the earth) is seen to equal the cosine of angle JME (the latitude), it may be said that the inclination of the gyro-axis from the vertical, due to the rotation of the earth, varies as the cosine of latitude from zero at the poles of the earth to its maximum on the equator.

The effect of the earth's rotation on the neutrally balanced gyro having now been explained, assume that the gyro is so balanced that its centre of gravity is below its point of support. In this case, the spinning gyro will have a continual tendency to bring its axis into the vertical, and will have a short period of precession of its own, say, two minutes. The gyro is now acting under two influences, namely, its own period of precession (say, 2 minutes), which is corrective, and the rotational period of precession (approximately 23 hours 56 minutes) which tends to deflect the gyro-axis from the vertical. As far as practice is concerned, these two periods are operating at right angles to each other, and for the purpose here required, they may be considered as the adjacent sides of a parallelogram of forces. In Figure 21, if JM is assumed to indicate the amount of the rotational period of precession, and PM the gyro's period of precession, then the resultant of these two periods will be as indicated by the dotted line JP; and the angle PJM will be the angle of inclination of the gyro-axis to the vertical, knowledge of which is required.

The angle of inclination may therefore be found in the following manner:—

$$\frac{MP}{JM} = \text{tangent PJM}.$$

Now, angle PJM actually represents the maximum amount of the rotational correction when the gyro is spinning on the equator, where the cosine of latitude is 1; therefore, in other latitudes the maximum amount of the rotational correction may be found by means of the formula:

Tangent rotational correction =

$$\frac{MP}{JM} \text{ cosine latitude}.$$

As previously explained, the spinning gyro is so affected by the rotation of the earth, that its upper plane surface is inclined from the horizontal and so is intersected by the true horizontal plane on an east and west line; which means that the rotational correction must also vary according to direction, and in order to explain the rule which governs this variation, Figure 21 will again be consulted.

In the figure, X is the position of a star, and NNX its azimuth north 30° west. Again, Y is the position of another star, the azimuth of which is north 60° west. The cosines of these azimuths, respectively, are XV and YT. Knowing that the upper end of the gyro-axis is drawn towards the pole of the hemisphere in which the gyro is spinning, and that the true horizontal plane passes through the upper plane surface of the gyro wheel, it is then obvious that the error caused by the earth's rotation is zero on east and west, and is of maximum amount on north and south. This variation is seen to agree with the variation of the azimuth cosine, which is zero on east and west, and reaches unity on north and south.

The complete formula for finding the rotational correction may therefore be written as:—

Tan. (Rotational correction) = $\frac{MP}{JM} \times$ (cosine latitude) $\times$ (cosine azimuth).

From the above formula, tables of rotational corrections are compiled and are appended. These tables give the rotational corrections for every 20° of latitude and 10° of azimuth; but for actual use in practice, it is preferable that the tables should be given in more extended form.

To use the tables, proceed as follows:—

Select the latitude table which corresponds nearest to the latitude of the observer. Then enter that table with the gyro's period of precession in the left hand side column, and with the azimuth of the observed body at the top; then in line with the gyro's period of precession, and under the azimuth, will be found the rotational correction required. For example: In latitude 40° north, an observation of a star was taken; the gyro's period of precession was 120 seconds, and the azimuth of the star was N. 50° W. Find the rotational correction?

In table for latitude 40°, in line with 120 seconds, and under azimuth 50°, the rotational correction is 2 minutes, 22 seconds of arc. Rotational corrections selected from the table are applied to the altitudes concerned, in accordance with the following rules:—When the gyro is spinning left handed, as in the northern hemisphere—

Rule 4:
(a) Add the correction when the observed object is south of the prime vertical.
(b) Subtract the correction when the observed object is north of the prime vertical.

When the gyro is spinning right handed, as in the southern hemisphere—

Rule 5:
(a) Subtract the correction when the observed object is south of the prime vertical.
(b) Add the correction when the observed object is north of the prime vertical.

Strictly speaking, there is another rotational correction which is caused by the movement of the ship herself. As before, this is negligible.

The above is the theoretical explanation of the finding of the rotational correction; it may however be found by direct observation as directed below:

Set the azimuth ring 40 to indicate true direction; then spin the gyro, and position the sextant with its telescope axis in a true east or west direction. An observation of the visible horizontal is then taken; and from this observation the angle between the visible horizon and the artificial horizon plane is completed. Then slue the sextant around until its telescope axis is in a true north or south direction, and from an observation taken on that point again compute the angle between the visible horizon and the artificial horizon plane; and as the gyro's period of precession is required to be known, this second observation is necessarily taken with the gyro spinning in a precessing condition. The difference between the time at A of the artificial horizon's path, and the time at C, will be the period required.

Now, as the rotational correction is zero on east and west, and of maximum amount on north and south, it is obvious that the difference between the angle on east and the angle on north will be the rotational correction in the meridian, for the latitude of the observer. If the angle on east is greater than the angle on north then the rotational correction is additive to all altitudes observed north of the prime vertical, and subtractive from all southern altitudes; and vice versa.

The rotational correction in the meridian having thus been found, it is an easy matter to calculate the corrections required for other azimuths in the same latitude, and for other precessional periods; for it is so that, the rotational correction varies as the cosine of azimuth, and as one precessional period is to another.

By this method, an observer can compile his own table of rotational corrections for the latitudes in which he is trading.

Having now completed the explanations of the corrections which must be applied to certain altitudes, the following is an example of an observation of a moving body, showing in particular how the true altitude may be found from the observed:

*Example.*—In latitude 40° north, an observation of a star was taken, and the following data noted:—

| | | H. m. s. |
|---|---|---|
| A reading +45 | chronometer time | 2 1 0 |
| B reading −65 | chronometer time | 2 2 10 |
| C reading +35 | chronometer time | 2 3 10 |
| Star's bearing | North 50 degrees east |
| Sextant reading | 55 degrees 2 minutes |
| Horizon correction | 20 degrees 0 minutes |

Then, upon entering table of rates of change in altitude, it is seen that the rate corresponding to latitude 40 and azimuth 50, is .147; and this rate is multiplied by the difference between the times at A and B, and again by the difference between the times B and C (both times being expressed in seconds), when the required change in altitude to apply to the AB, and BC sides of the artificial horizon's path are given.

Thus:

Rate×time AB=.147×70=10.2 to apply to side AB.
Rate×time BC=.147×60= 8.8 to apply to side BC.

Then, as A is above B on horizon screen, and the star is east of observer (Rule 3a) the time AB result is added to the side AB; and the time BC result is substracted from the side BC.

Therefore, side AB+time AB result=110+10.2=120.2 and, side BC−time BC result=100− 8.8= 91.2

When the sides AB and BC are corrected as above, the precessional correction is found (decimals need not be used).

P. Corr. AR $= \dfrac{AB^2}{AB+BC} = \dfrac{120^2}{120+91} =$ $\dfrac{14400}{211} = 68.2$ minutes of arc.

To find the rotational correction: The gyro's period of precession (i. e., the difference between the times at A and C) is seen to be 130 seconds. Then, in rotational correction table for latitude 40, in line with the nearest precessional period of gyro (i. e., 120 seconds), and under azimuth 50, the rotational correction is seen to be 2 minutes 22 seconds of arc; and by interpolating, the rotational correction corresponding to 130 seconds (which is the gyro's actual period of precession in this instance) is found to be 2 minutes 34 seconds of arc.

To correct altitude:—

| | | |
|---|---|---|
| Sextant reading | 55° | 2' |
| A reading (Rule 1a) | + 0 | 45 |
| | 55 | 47 |
| P. Corr. AR (Rule 2b) | − 1 | 8.2 |
| | 54 | 38.8 |
| Rotational correction (Rule 4b) | − 0 | 2.6 nearly |
| | 54 | 36.2 |
| Horizon correction (always subtractive) | −20 | 0 |
| | 34 | 36.2 |
| Refraction (from nautical tables) | − 0 | 1.4 |
| True altitude of star | 34 | 34.8 |

NOTE.—refraction is in accordance with the altitude after the precessional, rotational and the horizon corrections have been applied to it. In the above case, this altitude is 34 degrees 36.2 minutes of arc.

The time of an observation is the G. M. T. (or chronometer time corrected for error) noted at point A in the artificial horizon's path.

Rates of change in altitude, per second of time

| Azimuths | Latitudes | | | | | | | | |
|---|---|---|---|---|---|---|---|---|---|
| | 0° | 10° | 20° | 30° | 40° | 50° | 60° | 70° | 80° |
| 1° | .004 | .004 | .004 | .004 | .003 | .003 | .002 | .001 | .000 |
| 2 | .009 | .009 | .008 | .008 | .007 | .006 | .004 | .003 | .002 |
| 4 | .018 | .018 | .017 | .016 | .014 | .012 | .009 | .006 | .004 |
| 6 | .026 | .026 | .025 | .023 | .020 | .017 | .013 | .009 | .005 |
| 8 | .035 | .035 | .033 | .031 | .027 | .023 | .018 | .012 | .006 |
| 10 | .043 | .043 | .041 | .038 | .033 | .028 | .022 | .015 | .007 |
| 12 | .052 | .052 | .049 | .045 | .040 | .034 | .026 | .018 | .009 |
| 14 | .061 | .060 | .057 | .052 | .046 | .039 | .030 | .021 | .010 |
| 16 | .070 | .068 | .065 | .060 | .053 | .045 | .035 | .024 | .012 |
| 18 | .077 | .076 | .073 | .067 | .059 | .050 | .039 | .027 | .013 |
| 20 | .086 | .084 | .081 | .074 | .066 | .055 | .043 | .029 | .015 |
| 22 | .094 | .092 | .088 | .081 | .072 | .060 | .047 | .032 | .016 |
| 24 | .102 | .100 | .096 | .088 | .078 | .065 | .051 | .035 | .018 |
| 26 | .110 | .108 | .103 | .095 | .084 | .070 | .055 | .037 | .019 |
| 28 | .118 | .116 | .110 | .102 | .090 | .075 | .059 | .040 | .021 |

Rates of change in altitude, per second of time—con.

| Azimuths | Latitudes | | | | | | | | |
|---|---|---|---|---|---|---|---|---|---|
| | 0° | 10° | 20° | 30° | 40° | 50° | 60° | 70° | 80° |
| 30 | .125 | .123 | .117 | .108 | .096 | .080 | .063 | .043 | .022 |
| 32 | .133 | .131 | .124 | .115 | .102 | .085 | .067 | .046 | .023 |
| 34 | .140 | .138 | .131 | .121 | .107 | .090 | .070 | .048 | .024 |
| 36 | .147 | .145 | .138 | .127 | .113 | .095 | .074 | .051 | .026 |
| 38 | .154 | .152 | .145 | .133 | .118 | .099 | .077 | .053 | .027 |
| 40 | .161 | .159 | .151 | .139 | .123 | .104 | .081 | .055 | .023 |
| 42 | .167 | .165 | .157 | .145 | .128 | .108 | .084 | .057 | .029 |
| 44 | .173 | .171 | .163 | .151 | .133 | .112 | .087 | .060 | .030 |
| 46 | .179 | .177 | .169 | .156 | .138 | .116 | .090 | .062 | .031 |
| 48 | .186 | .183 | .175 | .161 | .143 | .120 | .093 | .064 | .032 |
| 50 | .192 | .189 | .180 | .166 | .147 | .123 | .096 | .066 | .033 |
| 52 | .197 | .195 | .185 | .171 | .151 | .127 | .099 | .068 | .034 |
| 54 | .202 | .200 | .190 | .175 | .155 | .130 | .101 | .069 | .035 |
| 56 | .207 | .205 | .195 | .180 | .159 | .133 | .104 | .071 | .036 |
| 58 | .212 | .209 | .200 | .184 | .162 | .136 | .106 | .073 | .037 |
| 60 | .217 | .213 | .204 | .188 | .166 | .139 | .108 | .075 | .038 |
| 62 | .221 | .217 | .207 | .191 | .169 | .142 | .110 | .076 | .028 |
| 64 | .225 | .221 | .211 | .194 | .173 | .145 | .112 | .077 | .039 |
| 66 | .228 | .225 | .215 | .196 | .175 | .147 | .114 | .078 | .040 |
| 68 | .232 | .228 | .218 | .200 | .177 | .149 | .116 | .079 | .041 |
| 70 | .235 | .231 | .221 | .203 | .179 | .151 | .118 | .080 | .042 |
| 72 | .238 | .234 | .224 | .206 | .182 | .153 | .119 | .081 | .042 |
| 74 | .240 | .237 | .226 | .208 | .184 | .154 | .120 | .082 | .042 |
| 76 | .243 | .239 | .228 | .200 | .186 | .156 | .121 | .083 | .042 |
| 78 | .245 | .241 | .230 | .212 | .187 | .157 | .122 | .084 | .043 |
| 80 | .246 | .243 | .232 | .213 | .189 | .158 | .123 | .085 | .043 |
| 82 | .247 | .244 | .233 | .214 | .190 | .159 | .124 | .085 | .043 |
| 84 | .248 | .245 | .234 | .215 | .191 | .160 | .125 | .085 | .043 |
| 86 | .249 | .246 | .234 | .216 | .191 | .160 | .125 | .085 | .043 |
| 88 | .249 | .246 | .235 | .216 | .192 | .161 | .125 | .086 | .043 |
| 90 | .250 | .246 | .235 | .216 | .192 | .161 | .125 | .086 | .043 |

Rotational corrections

Latitude 0°

| Precessional period of gyro in seconds | Azimuths | | | | | | | | |
|---|---|---|---|---|---|---|---|---|---|
| | 0° | 10° | 20° | 30° | 40° | 50° | 60° | 70° | 80° |
| | ′ ″ | ′ ″ | ′ ″ | ′ ″ | ′ ″ | ′ ″ | ′ ″ | ′ ″ | ′ ″ |
| 60 | 2 24 | 2 22 | 2 15 | 2 5 | 1 50 | 1 32 | 1 12 | 0 49 | 0 25 |
| 120 | 4 48 | 4 43 | 4 30 | 4 9 | 3 40 | 3 4 | 2 24 | 1 38 | 0 50 |
| 180 | 7 12 | 7 5 | 6 45 | 6 14 | 5 30 | 4 36 | 3 26 | 2 27 | 1 14 |

Latitude 20°

| Precessional period of gyro in seconds | Azimuths | | | | | | | | |
|---|---|---|---|---|---|---|---|---|---|
| | 0° | 10° | 20° | 30° | 40° | 50° | 60° | 70° | 80° |
| | ′ ″ | ′ ″ | ′ ″ | ′ ″ | ′ ″ | ′ ″ | ′ ″ | ′ ″ | ′ ″ |
| 60 | 2 15 | 2 13 | 2 7 | 1 57 | 1 44 | 1 27 | 1 8 | 0 46 | 0 24 |
| 120 | 4 30 | 4 26 | 4 14 | 3 54 | 3 27 | 2 53 | 2 15 | 1 32 | 0 47 |
| 180 | 6 45 | 6 39 | 6 20 | 5 51 | 5 10 | 4 21 | 3 23 | 2 19 | 1 10 |

Latitude 40°

| Precessional period of gyro in seconds | Azimuths | | | | | | | | |
|---|---|---|---|---|---|---|---|---|---|
| | 0° | 10° | 20° | 30° | 40° | 50° | 60° | 70° | 80° |
| | ′ ″ | ′ ″ | ′ ″ | ′ ″ | ′ ″ | ′ ″ | ′ ″ | ′ ″ | ′ ″ |
| 60 | 1 50 | 1 48 | 1 44 | 1 35 | 1 24 | 1 11 | 0 55 | 0 38 | 0 19 |
| 120 | 3 40 | 3 36 | 3 28 | 3 10 | 2 48 | 2 22 | 1 50 | 1 16 | 0 38 |
| 180 | 5 30 | 5 25 | 5 10 | 4 46 | 4 13 | 3 33 | 2 45 | 1 54 | 0 57 |

Latitude 60°

| Precessional period of gyro in seconds | Azimuths | | | | | | | | |
|---|---|---|---|---|---|---|---|---|---|
| | 0° | 10° | 20° | 30° | 40° | 50° | 60° | 70° | 80° |
| | ′ ″ | ′ ″ | ′ ″ | ′ ″ | ′ ″ | ′ ″ | ′ ″ | ′ ″ | ′ ″ |
| 60 | 1 12 | 1 11 | 1 7 | 1 2 | 0 55 | 0 46 | 0 36 | 0 24 | 0 12 |
| 120 | 2 24 | 2 23 | 2 14 | 2 4 | 1 50 | 1 32 | 1 12 | 0 48 | 0 24 |
| 180 | 3 35 | 3 33 | 3 22 | 3 7 | 2 45 | 2 18 | 1 48 | 1 14 | 0 37 |

Latitude 80°

| Precessional period of gyro in seconds | Azimuths | | | | | | | | |
|---|---|---|---|---|---|---|---|---|---|
| | 0° | 10° | 20° | 30° | 40° | 50° | 60° | 70° | 80° |
| | ′ ″ | ′ ″ | ′ ″ | ′ ″ | ′ ″ | ′ ″ | ′ ″ | ′ ″ | ′ ″ |
| 60 | 0 25 | 0 24 | 0 23 | 0 21 | 0 19 | 0 16 | 0 12 | 0 8 | 0 4 |
| 120 | 0 50 | 0 48 | 0 46 | 0 42 | 0 38 | 0 32 | 0 24 | 0 18 | 0 8 |
| 180 | 1 15 | 1 14 | 1 10 | 1 5 | 0 57 | 0 48 | 0 37 | 0 26 | 0 13 |

What I claim is:—

1. An artificial horizon and direction indicator comprising in combination a reflecting plane surface which tends to assume a horizontal position, an arm adapted to carry a sextant, a second arm fixed relatively to the former arm, means for carrying a horizontal line supported by the second arm, the image of which horizontal line in the reflecting surface can be observed by the sextant and forms an artificial horizon, a support for said arms, an azimuth ring, a lubber line and a pointer mounted on the support whereby the setting in azimuth of the sextant arm can be read and gimbal rings adapted to support the whole so as to be operative about a common centre.

2. An artificial horizon and direction indicator comprising in combination a gyro-wheel tending to assume a horizontal position the surface of which wheel forms a plane mirror, an arm adapted to carry a sextant, a second arm fixed relatively to the former arm, means for carrying a horizontal line supported by the second arm, the image of which horizontal line in the mirror can be observed by the sextant and forms an artificial horizon, a support for said arms, an azimuth ring, a lubber line and a pointer mounted on the support whereby the setting in azimuth of the sextant arm can be read and gimbal rings adapted to support the whole so as to be operative about a common centre.

3. In an artificial horizon and direction indicator as claimed in claim 2 a marking on the said surface which marking constitutes means for indicating when the velocity of spin of the gyro is sufficient for observation purposes.

4. In an artificial horizon and direction indicator as claimed in claim 2 a spinning point whereon the gyro-wheel is mounted, a fixed support for the said spinning point, a movable clutch member adapted to engage with the gyro-wheel and lift the spinning point from off the support, means for imparting rotary motion to the said clutch member thus causing the gyro-wheel to spin, and means for releasing the clutch member thereby replacing the spinning point on the said support while the gyro-wheel is spinning.

5. In an artificial horizon and direction indicator as claimed in claim 2 a spinning point whereon the gyro-wheel is mounted, a fixed support for the said spinning point, a movable clutch member adapted to engage with the gyro-wheel and lift the spinning point from off the support, means for imparting rotary motion to the said clutch member thus causing the gyro-wheel to spin, means for releasing the clutch member thereby replacing the spinning point on the said support while the gyro-wheel is spinning, and means for clamping the gyro-wheel against rotation.

6. In an artificial horizon and direction indicator as claimed in claim 2 a spinning point whereon the gyro-wheel s mounted, a support for the said spinning point, a clutch member adapted to engage with the gyro-wheel and lift the spinning point from off the support, means for imparting rotary motion to the said clutch member thus causing the gyro-wheel to spin, means for releasing the clutch member thereby replacing the spinning point on the said support while the gyro-wheel is spinning, and a spirit level adapted to indicate the inclination to the vertical of the gyro-wheel previous to declutching.

7. In an artificial horizon and direction indicator as claimed in claim 2, a vertically adjustable and replacement spinning point whereon the gyro-wheel is mounted.

8. In an artificial horizon and direction indicator as claimed in claim 2 means fixed relatively to the gyro-wheel for altering and regulating the precession of the gyro-wheel and for causing it to spin about an axis perpendicular to its reflecting surface.

9. An artificial horizon and direction indicator as claimed in claim 1, wherein the said means for carrying the horizontal line consists of a graduated screen whereon the said line is marked.

10. An artificial horizon and direction indicator as claimed in claim 2 wherein the said means for carrying the horizontal line consists of a graduated screen whereon the said line is marked.

11. An artificial horizon and direction indicator comprising a vertically adjustable stand adapted to support the instrument claimed in claim 1.

12. An artificial horizon and direction indicator comprising a vertically adjustable stand adapted to support the instrument claimed in claim 2.

13. In an artificial horizon and direction indicator as claimed in claim 2 a casing inclosing the gyro-wheel adapted to enable the said wheel to spin in vacuo and means carried by the said casing enabling the gyro to be clutched and declutched.

14. An artificial horizon and direction indicator comprising in combination a reflecting plane surface which tends to assume a horizontal position, a casing supporting said reflecting surface so that the latter shall be visible to an observer, an arm adapted to carry a sextant, a second arm fixed relatively to the former arm, a horizontal line, means for carrying the said horizontal line supported by the said second arm the image of which horizontal line in the reflecting surface is adapted to constitute an artificial horizon, a set of gimbal rings the inner ring of which is adapted to support all the aforesaid parts so as to be rotatable in azimuth about the axis of the said inner ring, a lubber line and an adjustable azimuth ring carried by the said inner ring, a pointer for use with the said azimuth ring and lubber line, said pointer being movable with the sextant arm, and a frame adapted to support the said gimbal rings so that the instrument constituted by the aforesaid parts is operative about a common centre.

15. An artificial horizon and direction indicator comprising in combination a reflecting surface tending to assume a horizontal position, a gyroscopic control for the said surface, a casing supporting the said control and surface so that the latter shall be visible to an observer, an arm adapted to carry a sextant, a second arm fixed relatively to the former arm, a horizontal line, means supported by the second arm adapted to carry the said horizontal line, a set of gimbal rings the inner of which is adapted to support the aforesaid parts so as to be rotatable about the axis of the said inner ring, a lubber line and an adjustable azimuth ring carried by the said inner ring, a pointer for use with the said azimuth ring and lubber line, said pointer being movable with the sextant arm, and a frame adapted to support the said gimbal rings so that the instrument constituted by the aforesaid parts is operative about a common centre.

16. An artificial horizon and direction indicator comprising in combination a gyro-wheel the upper surface of which is polished so as to act as a reflecting surface tending to assume a horizontal position, a casing supporting said gyro-wheel so that the reflecting surface is visible to an observer, a spinning point whereon the said gyro-wheel is mounted, a support for the said spinning point fixed as regards vertical movement relatively to the said casing, a rotatable and vertically movable clutch member adapted to engage with the gyro wheel so as to hold the said wheel either in a clamped or clutched position as required, means for imparting rotary motion to said clutch member so as to spin the gyro-wheel, means for raising the clutch member so as to clamp the gyro-wheel and for lowering the clutch member so that the spinning point may rest on its support while the said wheel is spinning.

17. In an artificial horizon and direction indicator as claimed in claim 16, an indicating mark on the surface of the gyro-wheel adapted to show when the speed of the said wheel is sufficiently high.

18. In an artificial horizon and direction indicator as claimed in claim 16 means whereby the gyro-wheel may be caused to rotate about an axis perpendicular to its reflecting surface.

19. In an artificial horizon and direction indicator as claimed in claim 16 means adapted to indicate the inclination to the vertical of the gyro-wheel axis previous to the declutching of the said wheel.

20. An artificial horizon and direction indicator as claimed in claim 15 wherein the said means for carrying the horizontal line consists of a graduated screen whereon the said line is marked.

21. In an artificial horizon and direction indicator as claimed in claim 14 a stand or frame which is vertically adjustable.

22. In an artificial horizon and direction indicator as claimed in claim 15 a stand or frame which is vertically adjustable.

23. In an artificial horizon and direction indicator as claimed in claim 16 means whereby the said casing can be exhausted of air.

24. In an artificial horizon and direction indicator, a gyro-wheel having a reflecting plane surface, and means to impart rotation to said gyro-wheel, said reflecting surface having a darkened portion near its peripheral edge serving to indicate to an observer whether or not the gyro-wheel is rotating fast enough for observation purposes.

25. In an artificial horizon and direction indicator, a gyro-wheel having a reflecting plane top surface, means to impart rotation to the gyro-wheel including a shaft section coaxially aligned with the gyro-wheel, a reversibly positioned power motor having a drive shaft projected at its respective ends, and means to couple one end or the other of the drive shaft to the shaft section to impart rotation to the gyro in one direction or another.

26. In an artificial horizon and direction indicator, a gyro-wheel having a reflecting plane top surface, means to impart rotation to the gyro-wheel including a shaft section coaxially aligned with the gyro-wheel, a reversibly positioned power motor having a drive shaft projected at its respective ends, and means to couple one end or the other of the drive shaft to the shaft section to impart rotation to the gyro in one direction or another, said motor drive shaft being coaxially aligned with said shaft section and gyro-wheel.

27. In an artificial horizon and direction indicator, a gyro-wheel having a reflecting plane top surface, means to impart rotation to the gyro-wheel including a shaft section coaxially aligned with the gyro-wheel, a power motor having a drive shaft projected at its respective ends, and means to couple one end or the other of the drive shaft to the shaft section to impart rotation to the gyro in one direction or another, said motor drive shaft being coaxially aligned with said shaft section and gyro-wheel, and said motor having swingable trunnion mounting to enable reversing movements thereof.

28. In an artificial horizon and direction indicator, a gyro wheel mounted on a spinning point, said gyro-wheel having a peripheral surface forming a part of a sphere, a driving motor, a clutch head driven by said motor and having a socket forming a part of a sphere and of a size to snugly receive the peripheral face of the gyro-wheel, and means to move the clutch head into and out of engagement with the gyro wheel for the purpose described.

29. In an artificial horizon and direction indicator, a gyro wheel mounted on a spinning point, said gyro-wheel having a peripheral surface forming a part of a sphere, a driving motor, a shaft section rotated by said motor and disposed coaxially with said gyro-wheel, a clutch head rotatable with and slidable along said shaft section and having a socket forming a part of a sphere and of a size to snugly receive the peripheral face of the gyro-wheel, and means to move the clutch head along the shaft section into and out of engagement with the gyro-wheel for the purpose described.

30. In an artificial horizon and direction indicator, a gyro-wheel mounted on a spinning point, said gyro-wheel having a peripheral surface forming a part of a sphere, a driving motor, a shaft section rotated by said motor and disposed coaxially with said gyro-wheel, a clutch head rotatable with and slidable along said shaft section and having a socket forming a part of a sphere and of a size to snugly receive the peripheral face of the gyro-wheel, and means to move the clutch head along the shaft section into and out of engagement with the gyro-wheel for the purpose described, said last named means comprising a toothed rack carried by the clutch head, and a rotary control shaft having a toothed wheel thereon enmeshed with said rack.

31. In an artificial horizon and direction indicator, a casing having a top portion, a gyro-wheel mounted on a spinning point beneath said top portion, said gyro-wheel having a peripheral surface forming a part of a sphere, a driving motor, a clutch head driven by said motor and having a socket forming a part of a sphere and of a size to snugly receive the peripheral face of the gyro-wheel, and means to move the clutch head into engagement with the gyro-wheel to lift it free of its spinning point and impart rotation to it or to lift it into engagement with the top portion to clamp it in inactive condition.

32. In an artificial horizon and direction indicator, a casing having a top portion, a gyro-wheel mounted on a spinning point beneath said top portion, said gyro-wheel having a peripheral surface forming a part of a sphere, a driving motor, a clutch head driven by said motor and having a socket forming a part of a sphere and of a size to snugly receive the peripheral face of the gyro-wheel, means to move the clutch head into engagement with the gyro-wheel to lift it free of its spinning point and impart rotation to it or to lift it into engagement with the top portion to clamp it in inactive condition, said last named means comprising a toothed rack carried by the clutch head, a rotary control shaft having a toothed wheel thereon enmeshed with said rack, and a trigger device to secure the control shaft in the gyro-wheel rotation effecting or clamping positions.

33. In an artificial horizon and direction indicator, a casing having a top portion, a protective face of soft material carried by the top portion, a gyro-wheel having a top plane reflecting surface and a clutch face and being mounted on a spinning point beneath the top portion, a motor driven clutch head, and means to move the clutch head into engagement with the gyro-wheel clutch face to lift the gyro-wheel off the spinning point and impart rotation thereto or to lift the reflecting surface into clamping relation against the protective face.

34. In an artificial horizon and direction indicator, a casing having a top portion, a protective face of soft material carried by the top portion, a gyro-wheel having a top plane reflecting surface and a clutch face and being mounted on a spinning point beneath the top portion, a motor driven clutch head, and means to move the clutch head into engagement with the gyro-wheel clutch face to lift the gyro-wheel off the spinning point and impart rotation thereto or to lift the reflecting surface into clamped relation against the protective face, said last named means comprising a toothed rack carried by the clutch head and a rotary control shaft having a toothed wheel thereon enmeshed with said rack.

35. In an artificial horizon and direction indicator, a casing having a top portion, a protective face of soft material carried by the top portion, a gyro-wheel having a top plane reflecting surface and a clutch face and being mounted on a spinning point beneath the top portion, a motor driven clutch head, means to move the clutch head into engagement with the gyro-wheel clutch face to lift the gyro-wheel off the spinning point and impart rotation thereto or to lift the reflecting surface into clamped relation against the protective face, said last named means comprising a toothed rack carried by the clutch head, a rotary control shaft having a toothed wheel thereon enmeshed with said rack, and a trigger device to secure the control shaft in the gyro-wheel rotation effecting or reflecting face clamping positions.

36. In an artificial horizon and direction indicator, a casing, a gyro-wheel having a top plane reflecting surface and mounted on a spinning point, a gimbal ring mounting for the casing, means to lift the gyro-wheel off its spinning point, impart rotation thereto and thereafter replace it spinning on said spinning point, and a spirit level to indicate the inclination to the vertical of the gyro-wheel previous to the replacement thereof on the spinning point.

37. In an artificial horizon and direction indicator, a casing, a gyro-wheel having a top plane reflecting surface and mounted on a spinning point, a gimbal ring mounting for the casing, means to impart rotation to the gyro-wheel, and means carried by the casing and movable into engagement with the rotating gyro-wheel by tilting the casing to steady the rotation of said wheel and avoid vibrative reflections.

38. In an artificial horizon and direction indicator, a casing, a gyro-wheel having a top plane reflecting surface and mounted on a spinning point, a gimbal ring mounting for the casing, means to lift the gyro-wheel off its spinning point, impart rotation thereto and thereafter replace it spinning on said spinning point, and means carried by the casing and movable into engagement with the rotating gyro-wheel by tilting the casing to steady the rotation of said wheel and avoid vibrative reflections, said last named means comprising yieldable fingers capable of flexing out of the way of the gyro-wheel as it is lifted and lowered from and onto the spinning point.

39. An artificial horizon and direction indicator comprising in combination a reflecting surface tending to assume a horizontal position, a gyroscopic control for the said surface, a casing supporting the said control and surface so that the latter shall be visible to an observer, a sextant carrying arm, a second arm fixed relatively to the first mentioned arm, an artificial horizon line supported on the second arm, said arms being supported by and projecting in opposite directions from the casing and of length for positioning the observation end of the sextant and the artificial horizon line equidistantly from the reflecting surface, a gimbal ring mounting for the casing, and indicating devices for the purpose specified.

40. An artificial horizon and direction indicator comprising in combination a reflecting surface tending to assume a horizontal position, a gyroscopic control for the said surface, a casing supporting the said control and surface so that the latter shall be visible to an observer, a sextant carrying arm, a second arm fixed relatively to the first mentioned arm, an artificial horizon line supported on the second arm, said arms being supported by and projecting in opposite directions from the casing and of length for positioning the observation end of the sextant and the artificial horizon line equidistantly from the reflecting surface, said sextant carrying arm having notches therein to receive portions of the sextant, and a latch to secure the sextant on said carrying arm.

41. In an artificial horizon and direction indicator wherein is provided a casing, and a gyro-wheel having a top plane reflecting surface rotatable within the casing; an artificial horizon carrying arm projected in one direction from the casing, and a sextant carrying arm projecting in the opposite direction from the casing and bearing such angular relation to the first mentioned arm that the reflection in the gyro-wheel reflecting surface of the artificial horizon line carried by said first mentioned arm is viewable through the sextant.

42. In an artificial horizon and direction indicator wherein is provided a casing, and a gyro-wheel having a top plane reflecting surface rotatable within the casing; an artificial horizon carrying arm projected in one direction from the casing, and a sextant carrying arm projecting in the opposite direction from the casing and bearing such angular relation to the first mentioned arm that the reflection in the gyro-wheel reflecting surface of the artificial horizon line carried by said first mentioned arm is viewable through the sextant, said sextant carrying arm having notches therein to receive portions of the sextant, and a latch to secure the sextant on said carrying arm.

43. An artificial horizon and direction indicator comprising in combination a reflecting plane surface which tends to assume a horizontal position, a casing supporting said reflecting surface so that the latter shall be visible to an observer, an arm adapted to carry a sextant, a second arm fixed relatively to the former arm, a horizontal line, means for carrying the said horizontal line supported by the said second arm the image of which horizontal line in the reflecting surface is adapted to constitute an artificial horizon, a set of gimbal rings the inner ring of which is adapted to support all the aforesaid parts so as to be rotatable in azimuth about the axis of the said inner ring, a lubber line and an adjustable azimuth ring carried by the said inner ring, a pointer for use with the said azimuth ring and lubber line, said pointer being movable with the sextant arm, and a frame to support said gimbal rings.

44. An artificial horizon and direction indicator comprising in combination a gyro-wheel tending to assume a horizontal position the surface of which wheel forms a plane mirror, a spinning point on which said gyro wheel is mounted, an arm adapted to carry a sextant, a second arm fixed relatively to the former arm, means for carrying a horizontal line supported by the second arm, the image of which horizontal line in the mirror can be observed by the sextant and forms an artificial horizon, a support for said arms, an azimuth ring, a lubber line and a pointer mounted on the support whereby the setting in azimuth of the sextant arm can be read and a universal gimbal ring mounting for the aforesaid mechanism the pivotal axes of which lie in a plane in common with the plane of the spinning point.

45. An artificial horizon and direction indicator, comprising in combination a reflecting surface tending to assume a horizontal position, a gyroscopic control for the said surface, a casing supporting the said control and surface so that the latter shall be visible to an observer, an arm adapted to carry a sextant, a second arm fixed relatively to the former arm, a horizontal line, means supported by the second arm adapted to carry the said horizontal line, a set of gimbal rings the inner of which is adapted to support the aforesaid parts so as to be rotatable about the axis of the said inner ring, a lubber line and an adjustable azimuth ring carried by the said inner ring, a pointer for use with the said azimuth ring and lubber line, said pointer being movable with the sextant arm, "compass to true" and "true to compass" indicia on said inner ring at respective sides of the lubber line, and a frame adapted to support the said gimbal rings so that the instrument constituted by the aforesaid parts is operative about a common centre.

46. In apparatus of the character described wherein is provided a casing, observation devices supported by the casing and a universal mounting for the casing; a fork to support the casing and having a depending support shaft, a support standard, and spaced spring rings supported by the standard and serving to support the support shaft.

47. In apparatus of the character described wherein is provided a casing, observation devices supported by the casing and a universal mounting for the casing; a fork to support the casing and having a depending support shaft, a support standard, and spaced spring rings supported by the standard and serving to support the support shaft, said support shaft being vertically adjustably supported in said spring rings.

In testimony that I claim the foregoing as my invention I have signed my name this 21st day of May, 1929.

LAURENCE HENRY MORRISON.